(12) United States Patent
Ourada

(10) Patent No.: US 11,608,128 B2
(45) Date of Patent: Mar. 21, 2023

(54) OSCILLATING TRACK SYSTEM

(71) Applicant: Teletrax Equipment, LLC, Cedar Rapids, IA (US)

(72) Inventor: Tim Ourada, Mascotte, FL (US)

(73) Assignee: Teletrax Equipment, LLC, Cedar Rapids, IA (US)

( * ) Notice: Subject to any disclaimer, the term of this patent is extended or adjusted under 35 U.S.C. 154(b) by 8 days.

(21) Appl. No.: 17/153,530

(22) Filed: Jan. 20, 2021

(65) Prior Publication Data

US 2021/0380183 A1    Dec. 9, 2021

Related U.S. Application Data

(63) Continuation of application No. 16/893,337, filed on Jun. 4, 2020, now Pat. No. 11,077,896.

(51) Int. Cl.
| | |
|---|---|
| *B62D 55/065* | (2006.01) |
| *B60G 9/02* | (2006.01) |
| *B62D 11/20* | (2006.01) |
| *B62D 55/112* | (2006.01) |

(52) U.S. Cl.
CPC .......... *B62D 55/0655* (2013.01); *B60G 9/02* (2013.01); *B62D 11/20* (2013.01); *B62D 55/112* (2013.01); *B60G 2200/32* (2013.01); *B60G 2204/4605* (2013.01); *B60G 2300/09* (2013.01)

(58) Field of Classification Search
CPC .. B62D 55/0655; B62D 11/20; B62D 55/112; B62D 55/116; B60G 9/02; B60G 2200/32; B60G 2204/4605; B60G 2300/09; B66F 9/0655; B66F 9/07522; B66F 9/07577; B66F 9/07586; B66F 9/105
See application file for complete search history.

(56) References Cited

U.S. PATENT DOCUMENTS

| | | | | |
|---|---|---|---|---|
| 4,819,754 | A * | 4/1989 | Purcell ................. | B62D 55/116 180/9.1 |
| 6,044,921 | A * | 4/2000 | Lansberry ............. | B60G 11/02 180/6.48 |
| 6,164,399 | A * | 12/2000 | Bays .................... | B62D 55/084 305/120 |

(Continued)

FOREIGN PATENT DOCUMENTS

| | | | | |
|---|---|---|---|---|
| WO | WO-2015053689 | A1 * | 4/2015 | ......... B62D 55/0655 |
| WO | WO-2021112755 | A1 * | 6/2021 | ........... B62D 53/005 |

*Primary Examiner* — Darlene P Condra
(74) *Attorney, Agent, or Firm* — Smith Tempel Blaha LLC; Matthew T. Hoots

(57) ABSTRACT

Disclosed are various embodiments, aspects and features an oscillating track system that includes an oscillating track lock subsystem. The oscillating track system may include a track operable to rotate around a housing structure that is configured to receive an axle. While in operation, i.e. while the track is being rotated around the housing, the oscillating track system may be able to oscillate about the axle and, in doing so, incline or decline to accommodate undulating terrain. Advantageously, when stopped, the degree to which the oscillating track system has oscillated around the axle may be locked in place via an oscillating track lock subsystem comprised within the oscillating track system, thereby providing stability to the heavy equipment that includes the oscillating track system.

6 Claims, 22 Drawing Sheets

(56) References Cited

U.S. PATENT DOCUMENTS

| | | | | |
|---|---|---|---|---|
| 8,430,188 B2* | 4/2013 | Hansen | .................. | B62D 55/04 |
| | | | | 180/9.26 |
| 2004/0020065 A1* | 2/2004 | Carr | ........................ | B61K 9/08 |
| | | | | 33/338 |
| 2009/0322057 A1* | 12/2009 | Quenzi | .................. | B60P 3/122 |
| | | | | 280/423.1 |
| 2010/0044124 A1* | 2/2010 | Radke | .................. | B60G 17/005 |
| | | | | 180/9.5 |
| 2012/0242142 A1* | 9/2012 | Kautsch | ................ | B62D 55/14 |
| | | | | 305/165 |
| 2020/0031391 A1* | 1/2020 | Coverdale | .............. | B62D 11/20 |
| 2021/0016848 A1* | 1/2021 | Johnson | ................ | B62D 55/305 |

\* cited by examiner

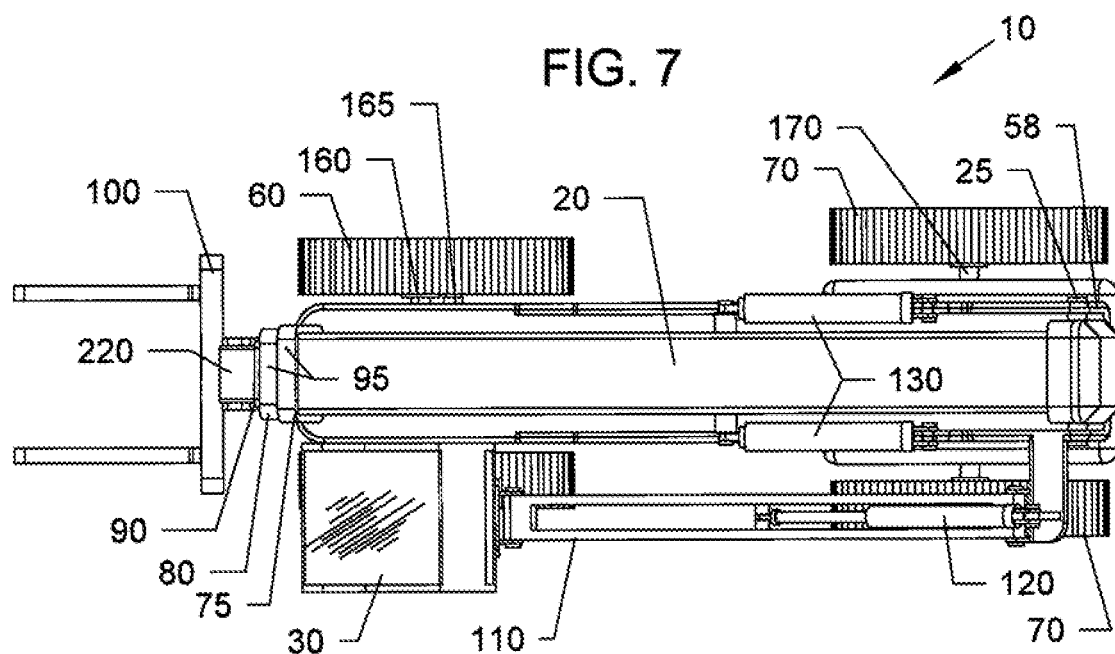
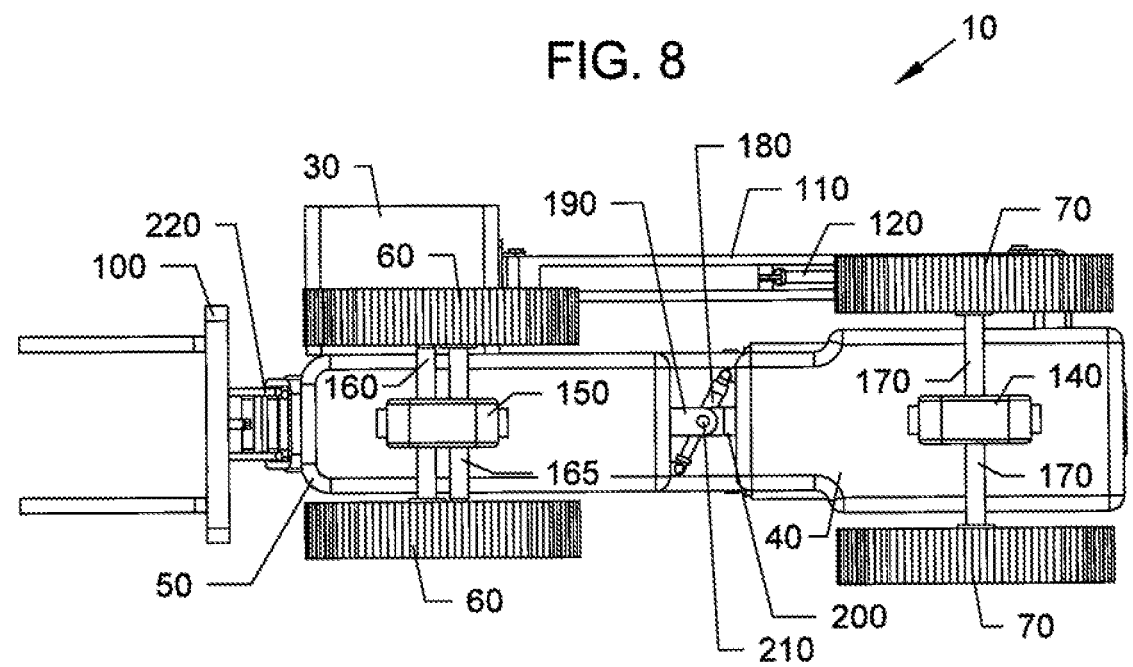

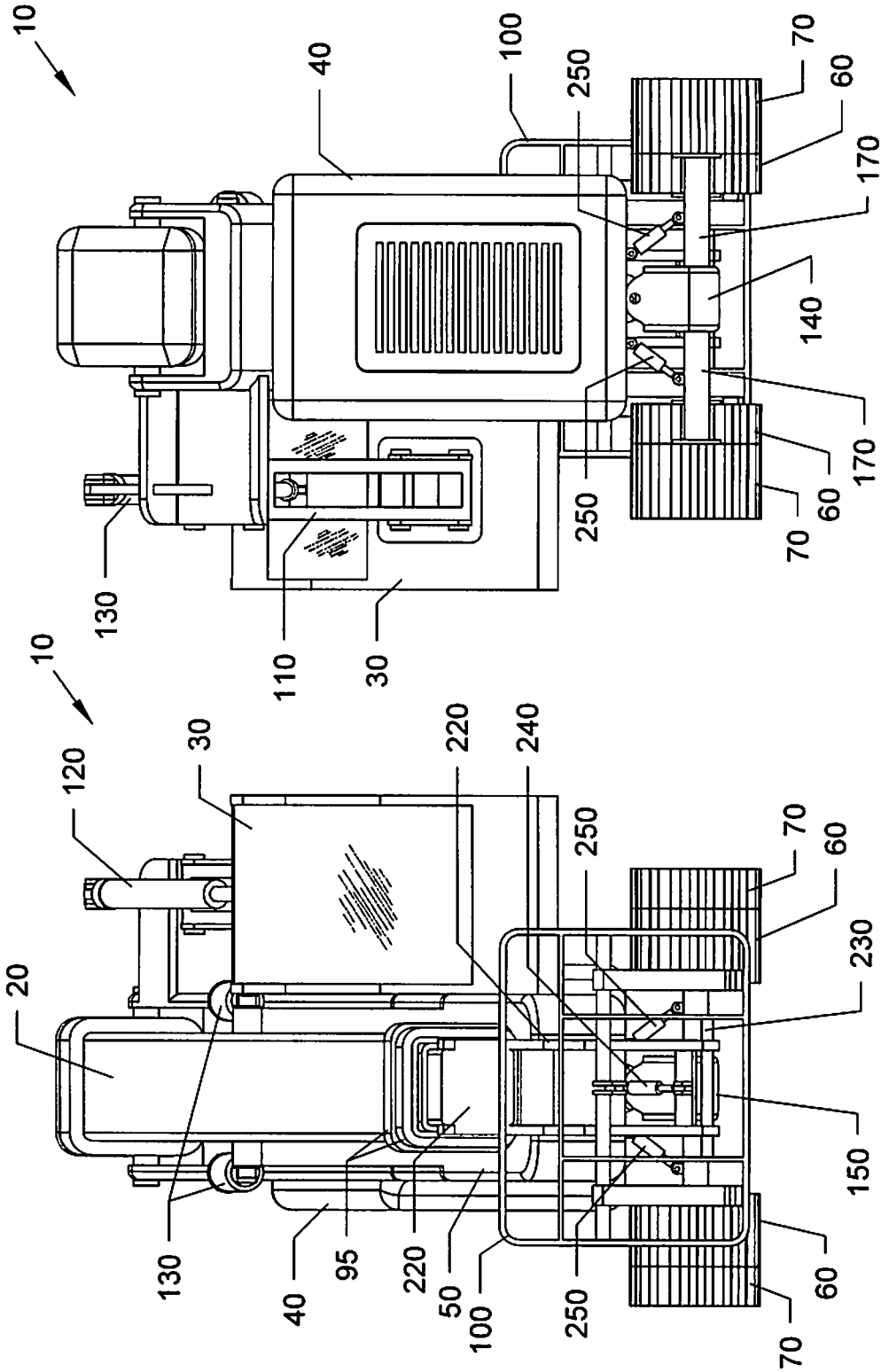

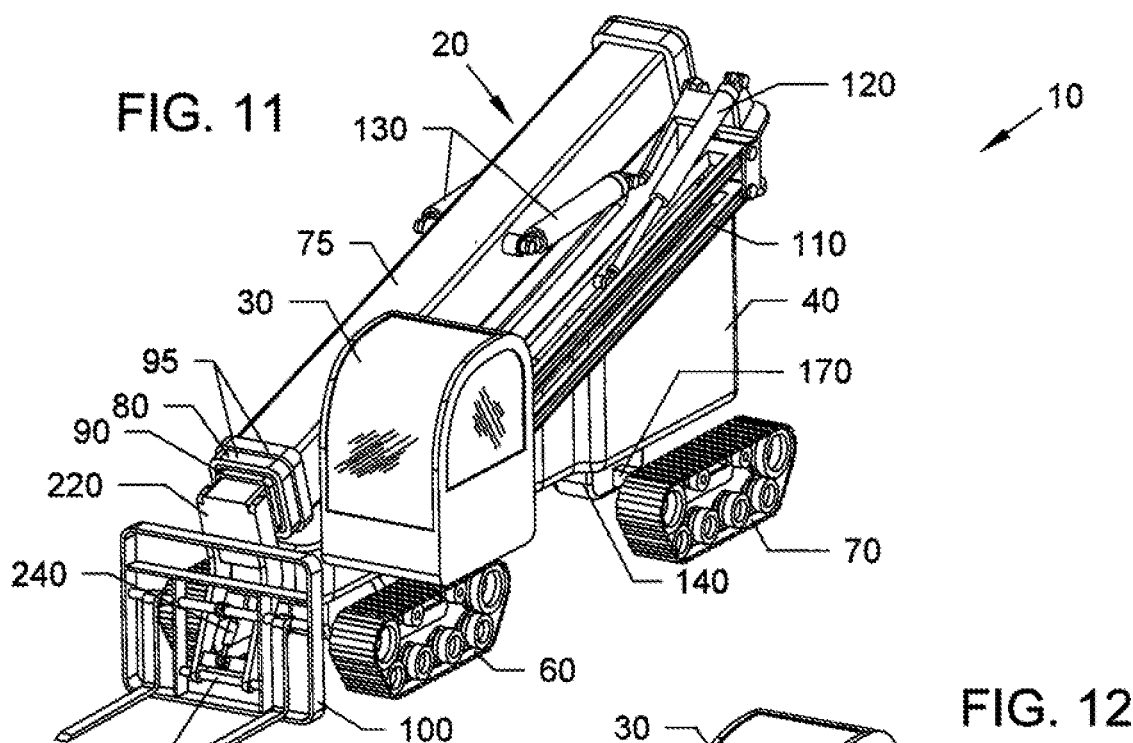

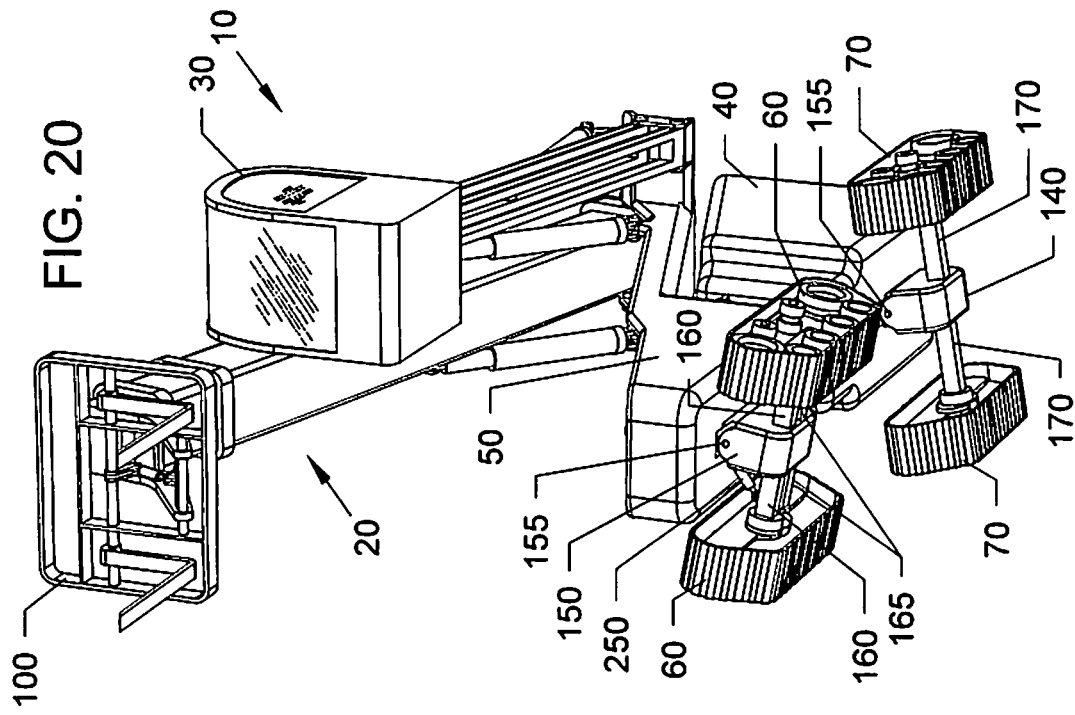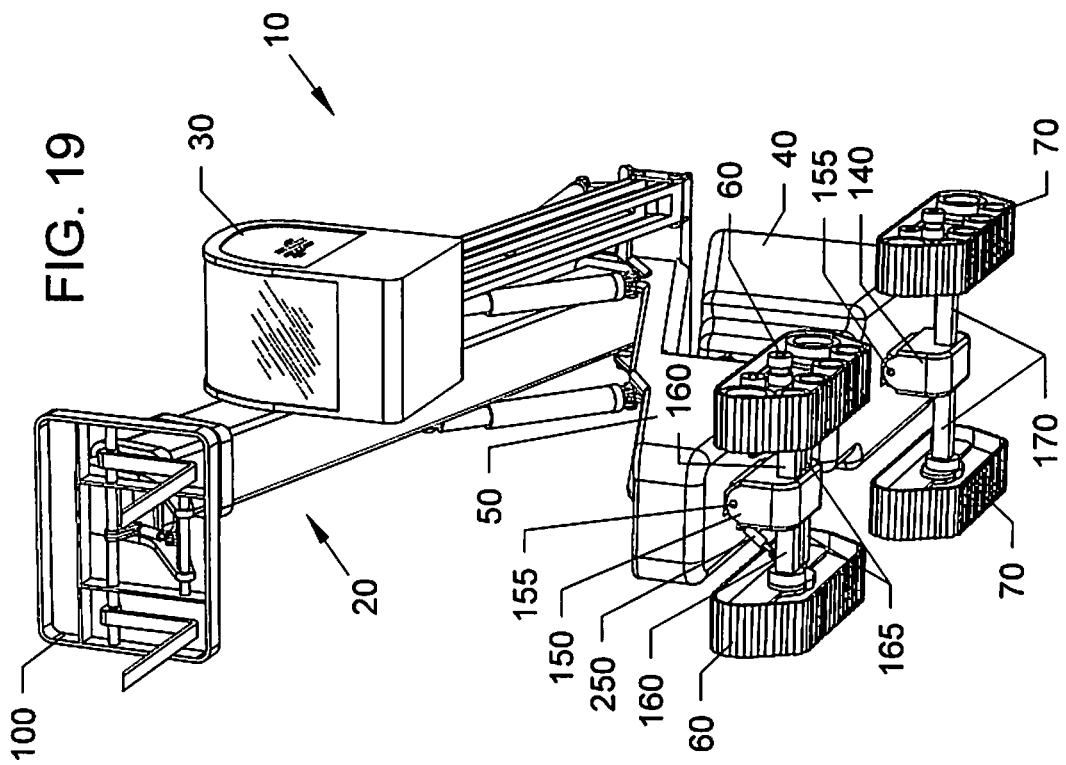

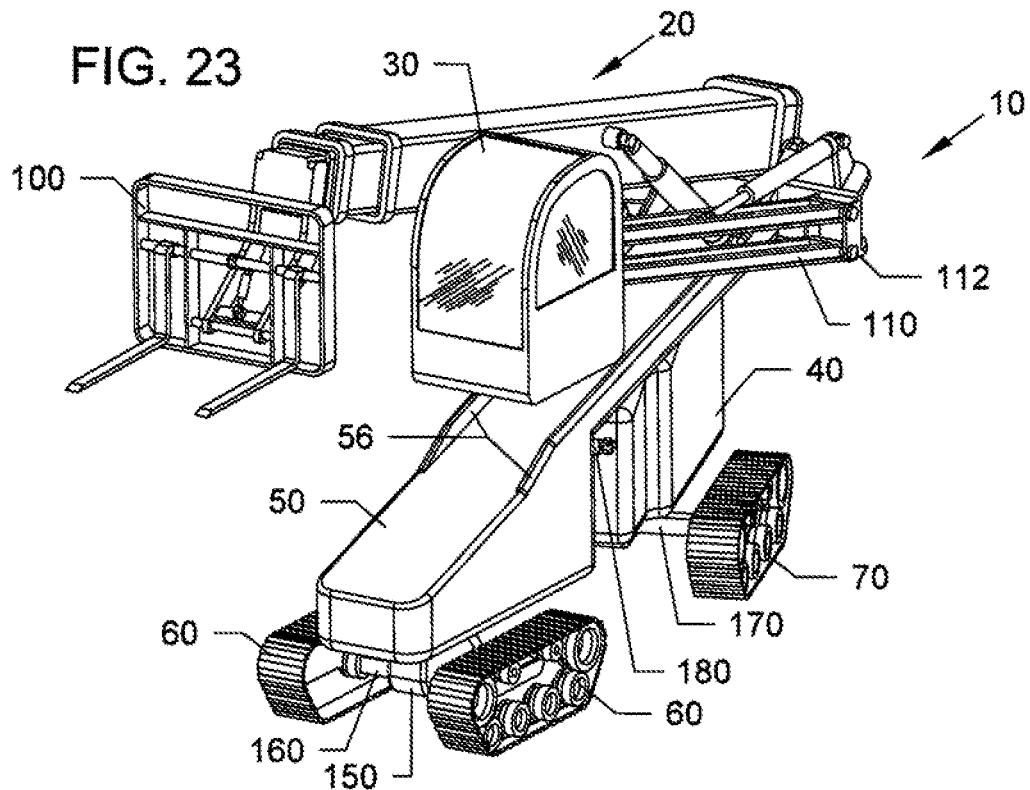
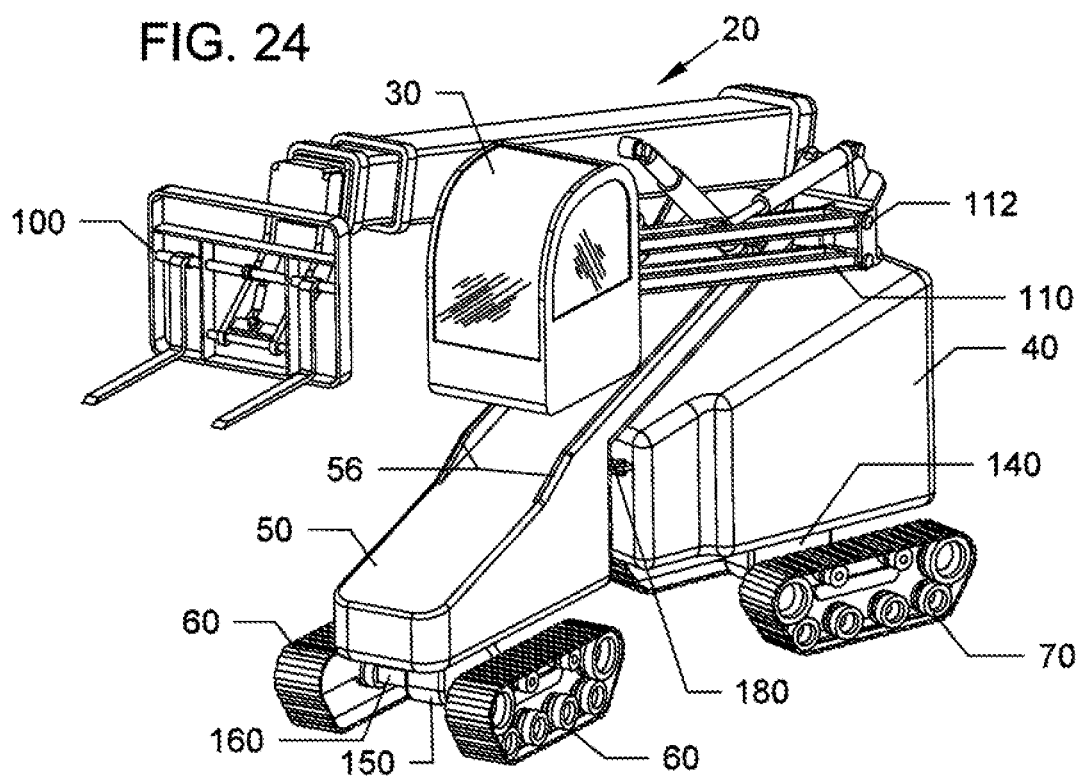

OSCILLATING TRACK SYSTEM

CROSS-REFERENCE TO RELATED APPLICATIONS

This application is a continuation of the U.S. non-provisional application entitled "Oscillating Track System", filed on Jun. 4, 2020 and assigned application Ser. No. 16/893,337, by and through which this application is related to the U.S. non-provisional application entitled "All Terrain Versatile Telescopic Fork Lift," filed on Mar. 14, 2018 and assigned application Ser. No. 15/920,617. The entire contents of both application Ser. Nos. 16/893,337 and 15/920,617 are hereby incorporated by reference.

BACKGROUND

The present solutions relate to heavy construction equipment, such as a telehandler, commonly used on outdoor construction sites and, more particularly, to heavy construction equipment that may benefit from oscillating track systems in lieu of wheels/tires. Oscillating track systems may provide benefits to equipment operators over wheels such as improved traction, improved stability, and smoother rides over undulating terrain.

When a heavy construction equipment using oscillating tracks is not in a mobile state such that the oscillating tracks need to adapt to the contour of an undulating terrain, that is stopped, it may be advantageous to prevent the oscillating tracks from inadvertently oscillating off a set position. And so, there is a need in the art for an oscillating track system comprising an oscillating track lock subsystem that allows for an operator to switch the oscillating track system from a free oscillating state to a locked position state, and vice versa.

BRIEF SUMMARY

Various embodiments, aspects and features of the present invention comprise an oscillating track system that includes an oscillating track lock subsystem. The oscillating track system may include a track operable to rotate around a housing structure that is configured to receive an axle. While in operation, i.e. while the track is being rotated around the housing, the oscillating track system may be able to oscillate about the axle and, in doing so, incline or decline to accommodate undulating terrain. Advantageously, when stopped, the degree to which the oscillating track system has oscillated around the axle may be locked in place via an oscillating track lock subsystem comprised within the oscillating track system, thereby providing stability to the heavy equipment that includes the oscillating track system.

An exemplary embodiment of an oscillating track system according to the solution includes a housing defining an internal space. An axle extends through the internal space and the housing is operable to oscillate around the axle. A plurality of wheels may be mounted external to the housing and at least one of the plurality of wheels may be operable to transfer torque to a track. An axle sleeve mechanically fixed to a portion of the axle may reside within the internal space. And, an oscillating track lock subsystem residing within the internal space may comprise at least a first mechanical connection to the housing and at least a second mechanical connection to the axle sleeve. In this way, the oscillating track lock subsystem may be able to adjust in concert with oscillation of the system around the axle and, advantageously, may be operable to temporarily lock the housing from oscillating around the axle. The exemplary oscillating track system may further include a stop block fixedly mounted within the internal space of the housing as well as a forward-tilt limit stop and a backward-tilt limit stop fixedly mounted to the axle sleeve. Advantageously, oscillation of the housing around the axle in a given rotational direction may be prevented when the forward-tilt limit stop or the backward-tilt limit stop mechanically engages with the stop block.

An exemplary oscillating track lock subsystem, such as the one comprised within the exemplary oscillation track system in the previous example, may include at least one hydraulic cylinder comprising a barrel, a piston and a rod. The barrel may be associated with the first mechanical connection to the housing and the rod (via a clevis, for example) may be associated with a second mechanical connection to an axle sleeve fixedly mounted to the axle. The subsystem may further include a valve operable to transition between an open flow state and a closed flow state, such as a solenoid valve or an automated quarter-turn type valve. The valve may be configured to allow in the open flow state to allow flow of hydraulic fluid between an upper volume and a lower volume defined within the barrel of the at least one hydraulic cylinder. Conversely, the valve may also be configured in the closed flow state to prevent flow of hydraulic fluid between the upper volume and the lower volume defined within the barrel of the hydraulic cylinder such that oscillation of the housing around the axle is temporarily locked. The exemplary subsystem may also include an accumulator in fluid communication with the valve and operable to contain hydraulic fluid. The accumulator may be of any suitable type including, but not limited to, a bladder-type accumulator or a piston-type accumulator. The exemplary oscillating track lock subsystem may also include a forward-tilt limit stop and a backward-tilt limit stop fixedly mounted to the axle sleeve and operable to prevent further oscillation of the housing around the axle in a given rotational direction when the forward-tilt limit stop or the backward-tilt limit stop mechanically engages with a stop block.

An exemplary method according to the solution for transitioning an oscillating track system that is operable to oscillate around an axle between a free oscillating state and a locked position state begins by anchoring one or more hydraulic cylinders at a first anchor point to the housing of the oscillating track system and at a second anchor point to the axle. Next, a valve is disposed between the one or more hydraulic cylinders and an accumulator such that the one or more hydraulic cylinders are in fluid communication with the accumulator via the valve. Finally, the valve may be actuated such that the valve transitions from an open flow state to a closed flow state since when the valve is in an open flow state the oscillating track system is in a free oscillating state and when the valve is in a closed flow state hydraulic fluid is prevented from exiting the one or more hydraulic cylinders and the oscillating track system is caused to be in a locked position state.

BRIEF DESCRIPTION OF THE SEVERAL VIEWS OF THE DRAWING

In the Figures, like reference numerals refer to like parts throughout the various views unless otherwise indicated. For reference numerals with letter character designations such as "110A" or "110B", the letter character designations may differentiate two like parts or elements present in the same Figure. Letter character designations for reference numerals may be omitted when it is intended that a reference numeral to encompass all parts having the same reference numeral in all Figures.

FIG. 7 is a top view of the vehicle of FIG. 5;

FIG. 8 is a bottom view of the vehicle of FIG. 5;

FIG. 9 is a front view of the vehicle of FIG. 5;

FIG. 10 is a rear view of the vehicle of FIG. 5;

FIG. 11 is a front right perspective view of the vehicle of FIG. 1 with boom and articulating cab fully down;

FIG. 12 is a front right perspective view of the vehicle of FIG. 12 with boom raised slightly and cab raised above boom for operator visibility;

FIG. 19 is a bottom right perspective view of the vehicle of the preceding figures showing the axle's and tracks parallel to one another and parallel to the superstructure;

FIG. 20 is another perspective view of FIG. 19, showing how the axles and tracks rotate about the axle hinge pins;

FIG. 23 is a front right perspective view of the vehicle of the preceding figures showing the rear engine compartment angled to the left relative to the superstructure on the front body;

FIG. 24 is another view of FIG. 23 with the engine compartment angled to the right relative to the superstructure on the front body;

DESCRIPTION

Figure 1:
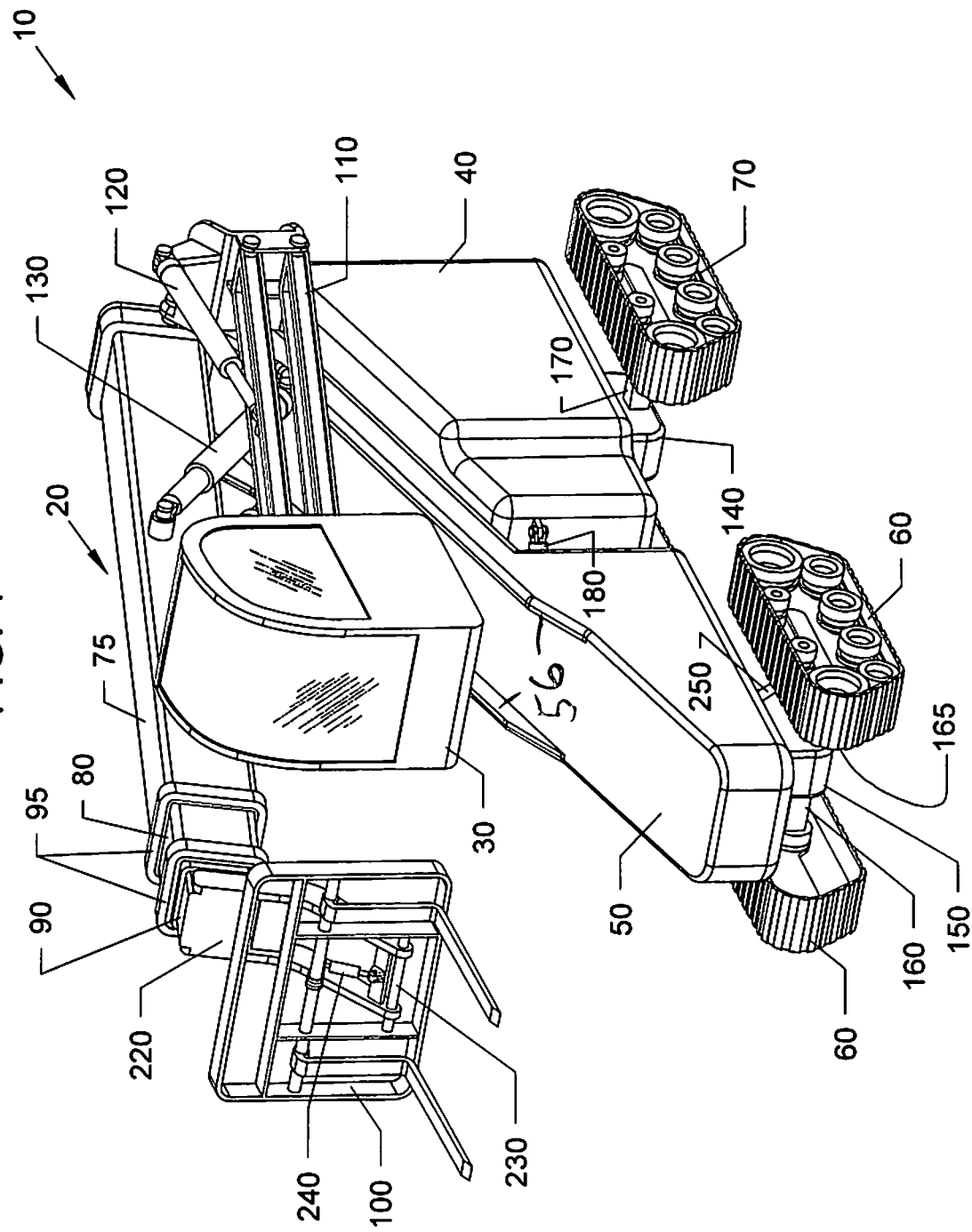
FIG. 1 is a front right perspective view of the all terrain versatile telescopic forklift vehicle with articulating cab and boom slightly raised with boom retracted.

The Figures and the related description are offered for illustrative purposes and collectively depict aspects and features of an exemplary embodiment of a unique and novel all-terrain telehandler particularly suited for payload handling on construction sites. Among other features, embodiments of the telehandler depicted and described herein may include one or more oscillating track systems comprising oscillating track lock subsystems advantageously configured to switch the oscillating track system from a free oscillating state to a locked position state, and vice versa. Details and advantages of the solution for an oscillating track system will become apparent upon review of the figures and description that follows. Notably, although an exemplary embodiment of the solution for an oscillating track system is shown and described herein within the context of a novel telehandler, it will be understood that the disclosed solution for an oscillating track system, and its variants, are not limited in application for use with telehandlers and, as such, it is envisioned that embodiments of the solution may be leveraged on any equipment that may benefit from a drivetrain that includes an oscillating track system.

In this description, label 10 refers to an all-terrain vehicle with articulating tracks, bodies, boom, and cab. Label 20 refers to a telescoping boom, label 30 refers to a cab that raises and lowers on hydraulic power, and label 40 refers to a rear body/engine compartment. 50 refers to a front body/superstructure that provides the foundation of the front tracks, the articulating boom, and the articulating cab, with the superstructure connected to the engine compartment with a hinge bracket. Label 54 is an upper portion bracket, label 56 are raised sides, and label 58 refers to the upper end brackets of the superstructure.

In this description, label 60 refers to a front oscillating track assembly. As will become more apparent from the disclosure, front oscillating track assemblies may be configured to rotate about an axle center-line and lock in a given position such that the assembly is unable to oscillate. Similarly, label 70 refers to a rear oscillating track assembly. Rear oscillating track assemblies may be configured to rotate about an axle center-line but inoperable to lock into a non-oscillating state.

In this description, label 75 refers to a large boom section, label 80 a middle boom section, and label 90 a small boom section. Label 95 refers to boom stops, label 100 a fork assembly, and label 110 a cab linkage that raises and lowers the cab while keeping it level relative to the superstructure by means of a hydraulic cylinder. Label 112 refers to a lower hinged bracket, label 118 an upper hinged bracket, and label 120 a hydraulic cylinder operable to articulate the cab. Label 130 refers to hydraulic cylinders for raising and lowering the boom.

Label 140 refers to a rear track bracket that is attached to the bottom of the engine compartment via a hinge pin. Advantageously, the rear track bracket 140 enables the rear oscillating track subassemblies and transmission to rotate in a plane perpendicular to the bottom of the engine compartment, thereby keeping the telehandler level on uneven ground. This rotation is free to follow the angle of the superstructure as it adjusts to ground level conditions. Similarly, label 150 refers to the front track bracket that is attached to the bottom of the superstructure in the same way as the rear transmission. Additionally, there may be two hydraulic cylinders linking the transmission to the superstructure. These cylinders may be controlled by the operator to keep the superstructure relatively level regardless of ground conditions. As previously mentioned, the engine compartment may be free to self-adjust and follow the orientation of the superstructure.

In this description, label 155 refers to a bracket hinge pin. Label 160 refers to a front left axle housing. The front oscillating track subassembly transmission may house two outer axle housings. Each housing may contain one extendable inner axle, one for the left axle and one for the right axle. These individual axles may telescope, thereby enabling the oscillating track subassemblies to move away from the superstructure giving them a wider footprint and adding stability to the superstructure. Label 163 refers to a front left extendable inner axle that telescopes out of an axle housing to place the oscillating track subassembly further away from the superstructure for increased stability.

In this description, label 165 refers to a front right axle housing and label 167 refers to a front right extendable inner axle. Label 170 refers to a rear axle. The rear track bracket may house one non-extendable axle for each oscillating track subassembly.

In this description, label 180 refers to a hydraulic cylinder that connects the superstructure and the engine compartment allowing the operator to control the angle orientation of one relative to the other. Label 190 refers to the superstructure hinge bracket that connects to engine compartment hinge bracket with a pivot pin so that the two can articulate about the pin. Label 200 refers to the engine compartment hinge bracket and label 210 refers to a hinge bracket pivot pin. Label 220 refers to a fork bracket that is attached to the end of the small boom section. This fork bracket 220 also attaches to the fork assembly via a hinge pin so that the fork bracket may articulate forward and backward by way of a hydraulic cylinder controlled by the operator.

In this description, label 230 refers to a fork assembly hinge pin and label 240 refers to a fork assembly hydraulic cylinder. Label 250 refers to front track transmission hydraulic cylinders operable to orient the front transmission to the superstructure by about the transmission pivot pin. They may be controlled by the operator.

In this description, label 260 refers to ground that is relatively uneven or not level while label 270 refers to ground that is relatively level. Label 280 refers to ground obstacles such as, but not limited to, a log or rock.

Figure 2:
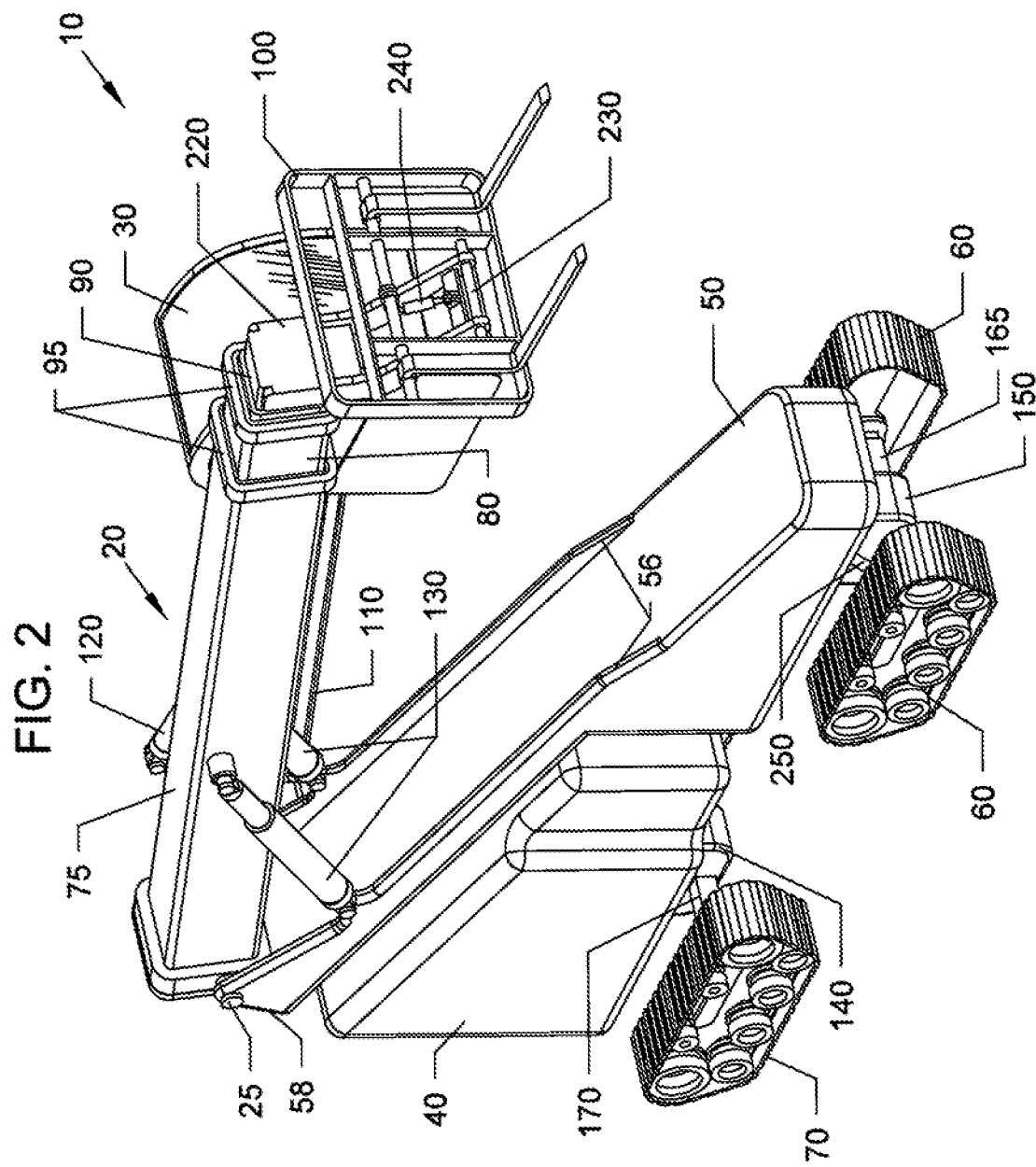
FIG. 2 is a front left perspective view of the vehicle of FIG. 1.
Figure 3:
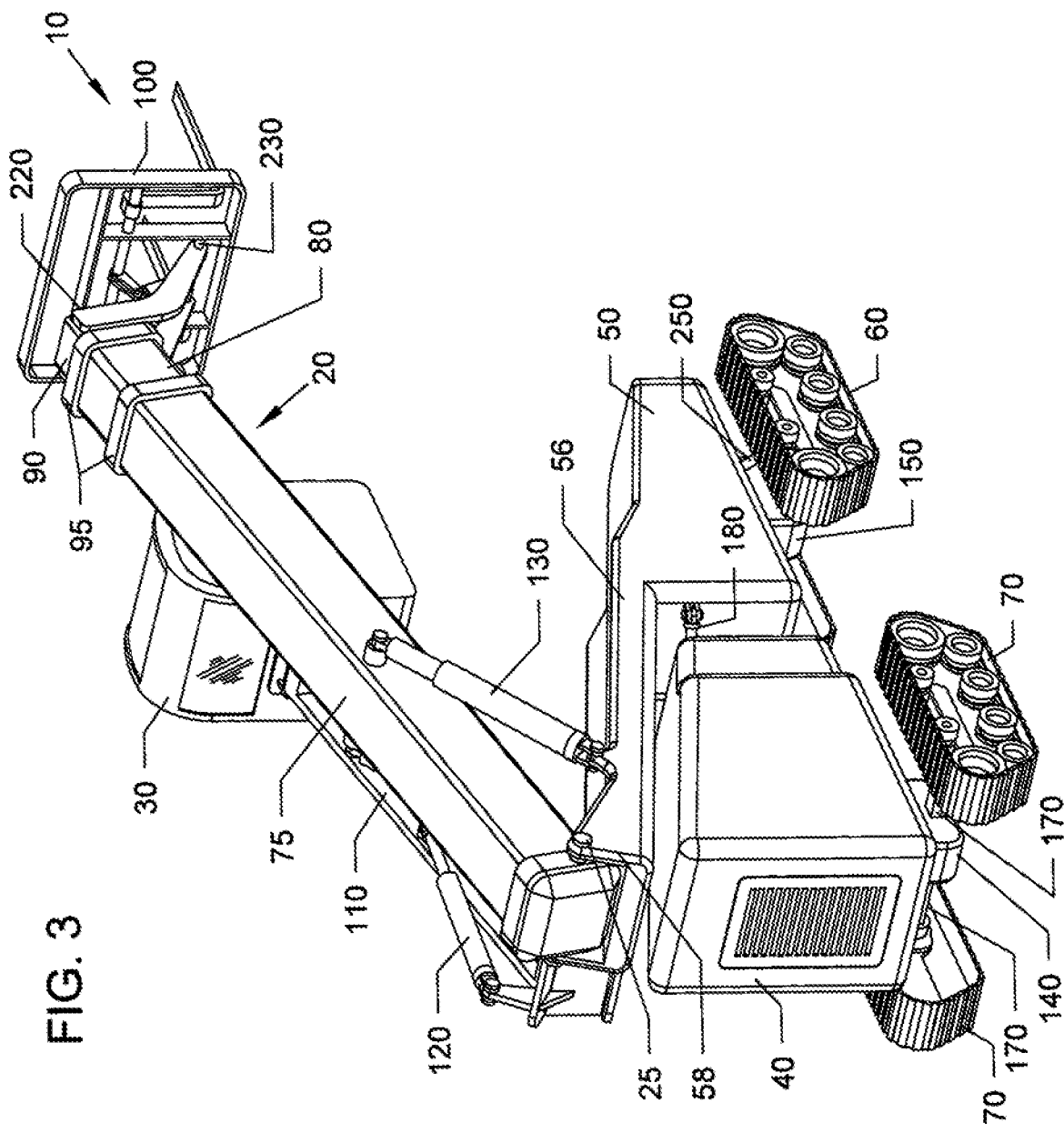
FIG. 3 is a rear right perspective view of the vehicle of FIG. 1.
Figure 4:
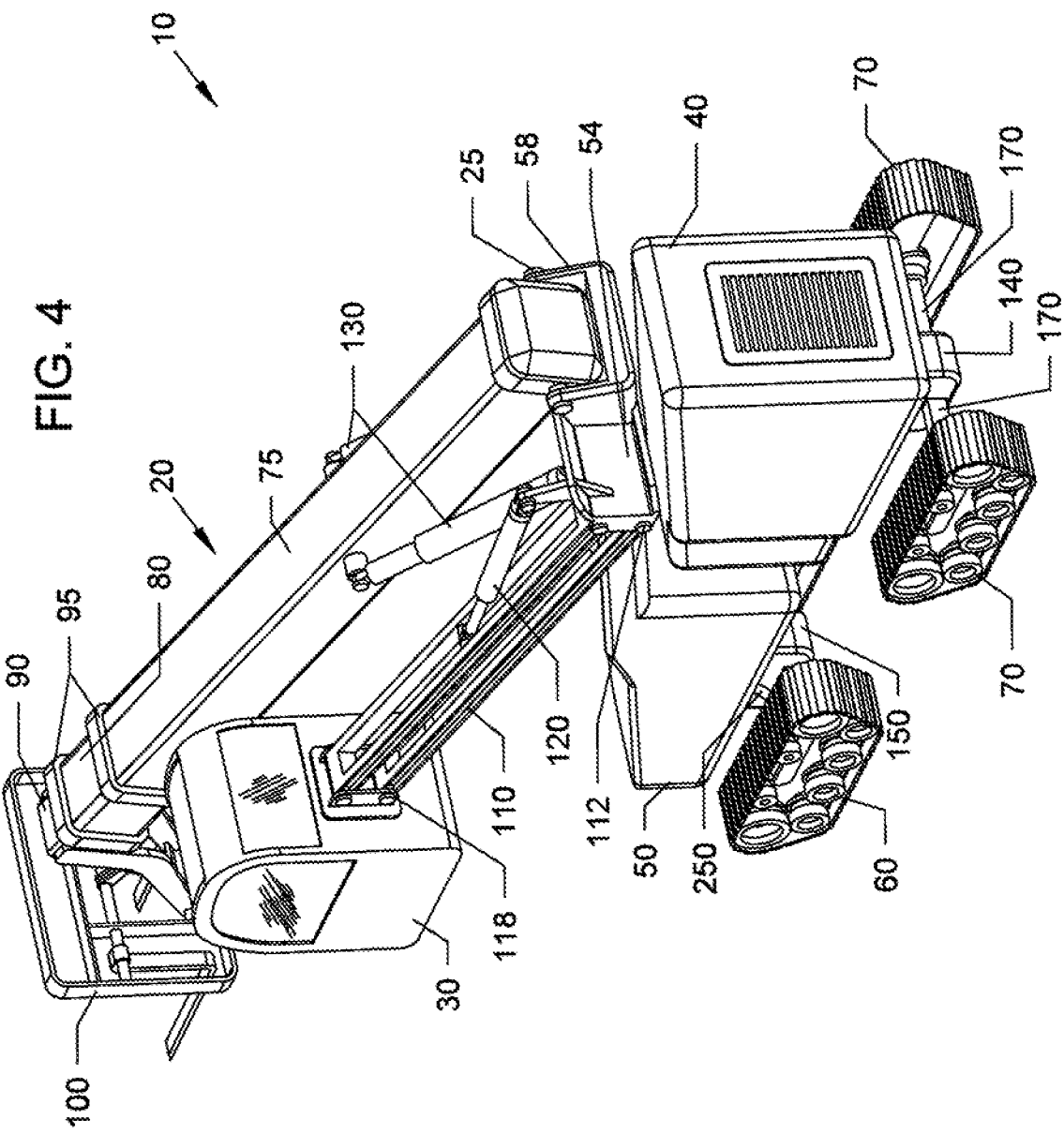
FIG. 4 is a rear left perspective view of the vehicle of FIG. 1.
Figure 5:
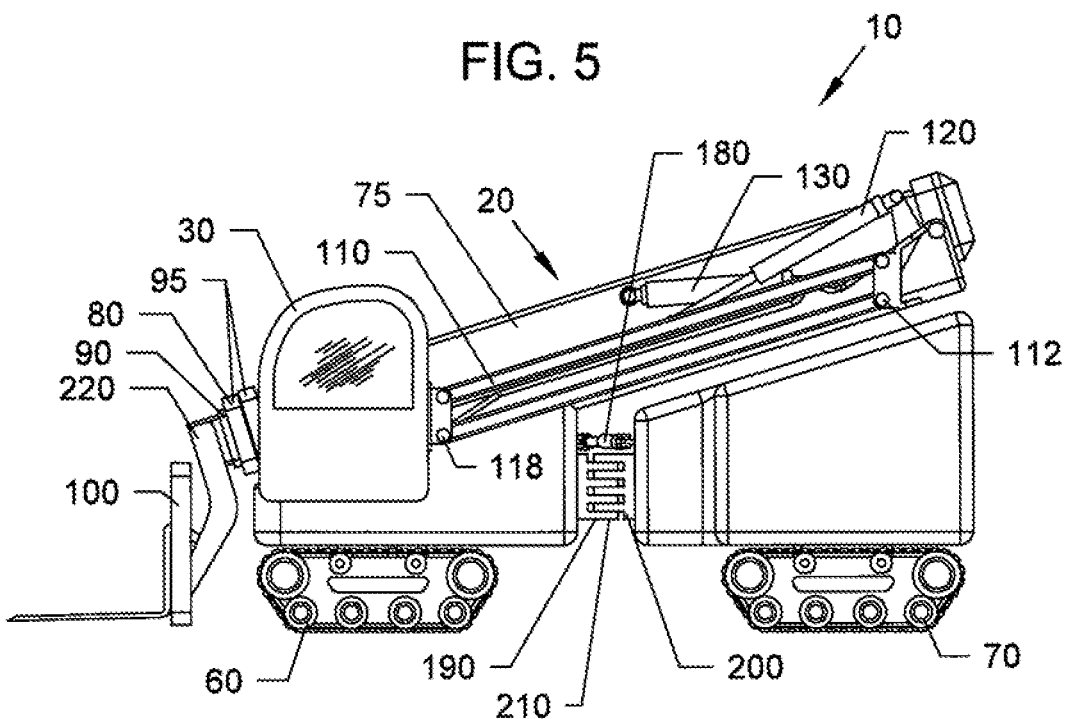
FIG. 5 is a right side view of the vehicle of FIG. 1 with cab and boom in down position.
Figure 6:
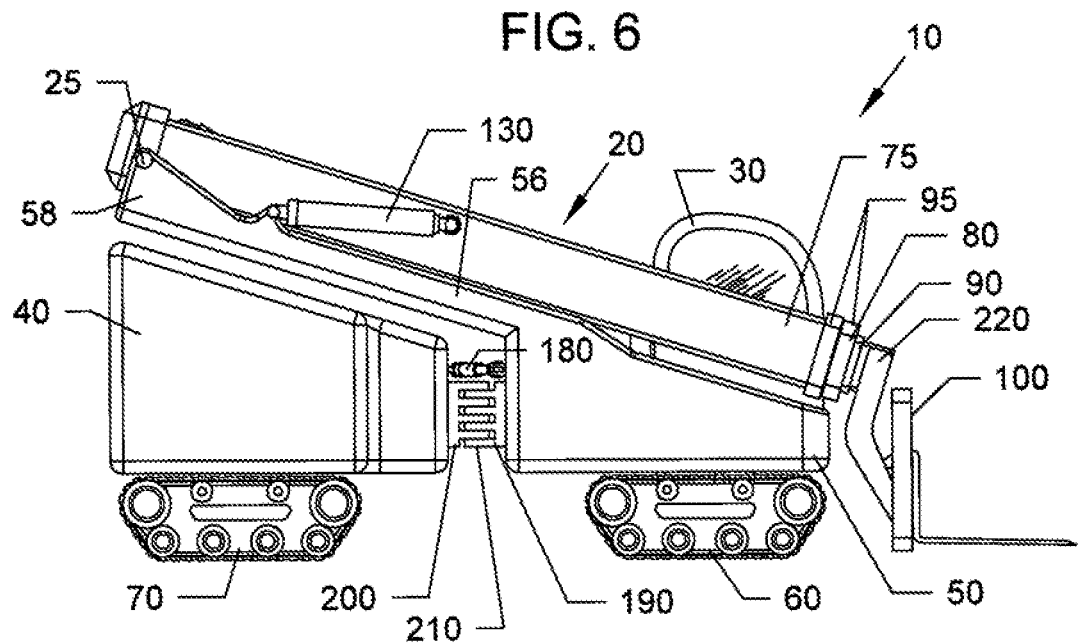
FIG. 6 is a left side view of the vehicle of FIG. 5.

Referring now to the figures, FIG. 1 is a front right perspective view of the novel all terrain versatile telescopic forklift vehicle 10 with articulating cab 30 and telescoping boom 20 slightly raised with telescopic boom 20 in a retracted position. FIG. 2 is a front left perspective view of the vehicle 10 of FIG. 1. FIG. 3 is a rear right perspective view of the vehicle 10 of FIG. 1. FIG. 4 is a rear left perspective view of the vehicle 10 of FIG. 1. FIG. 5 is a right side view of the vehicle 10 of FIG. 1 with cab 30 and telescoping boom 20 in a down position. FIG. 6 is a left side view of the vehicle 10 of FIG. 5. FIG. 7 is a top view of the vehicle 10 of FIG. 5. FIG. 8 is a bottom view of the vehicle 10 of FIG. 5. FIG. 9 is a front view of the vehicle 10 of FIG. 5.

Figure 13:
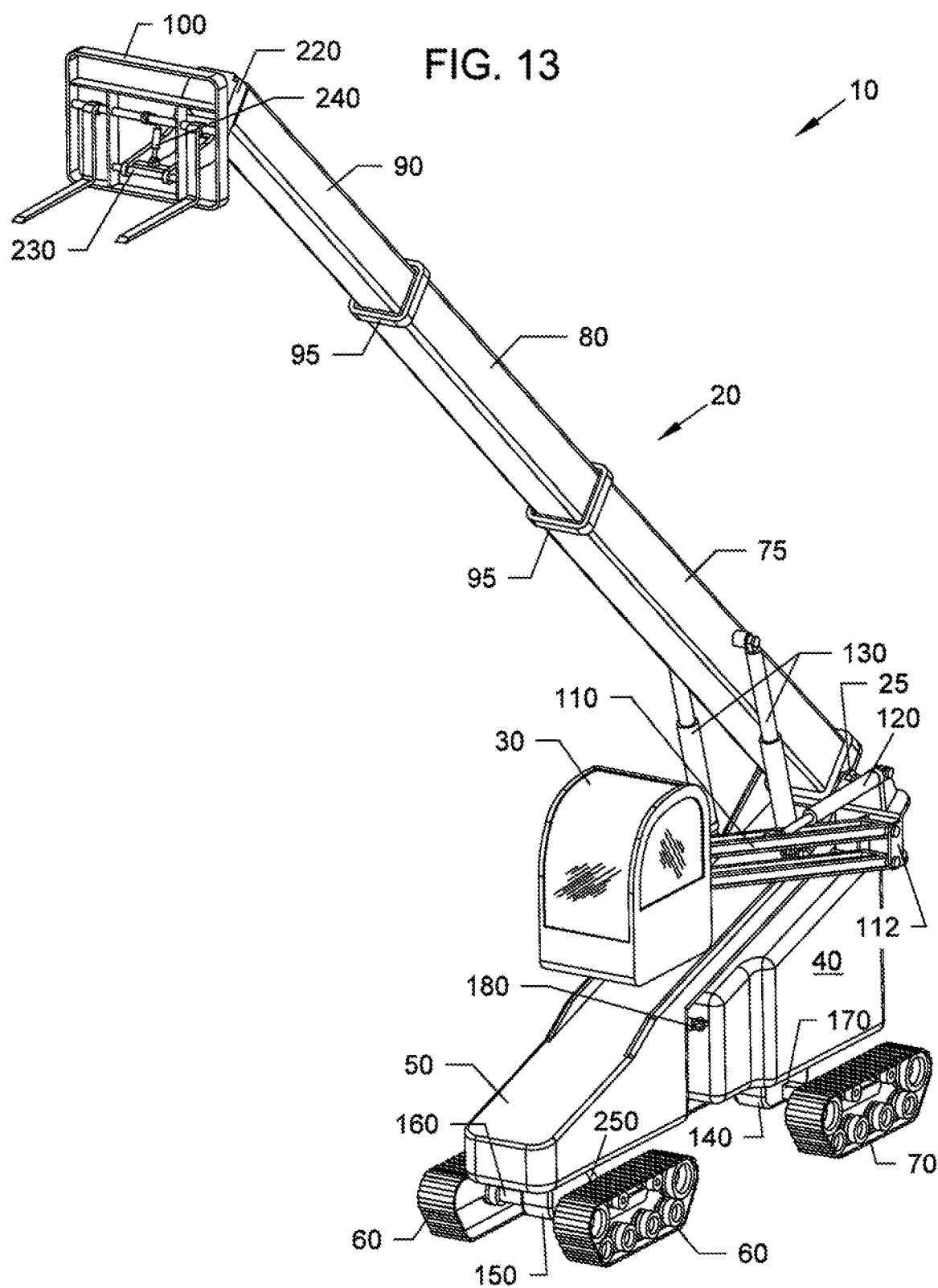
FIG. 13 is a front right perspective view of the vehicle of FIG. 12 with boom full raised and extended.
Figure 14:
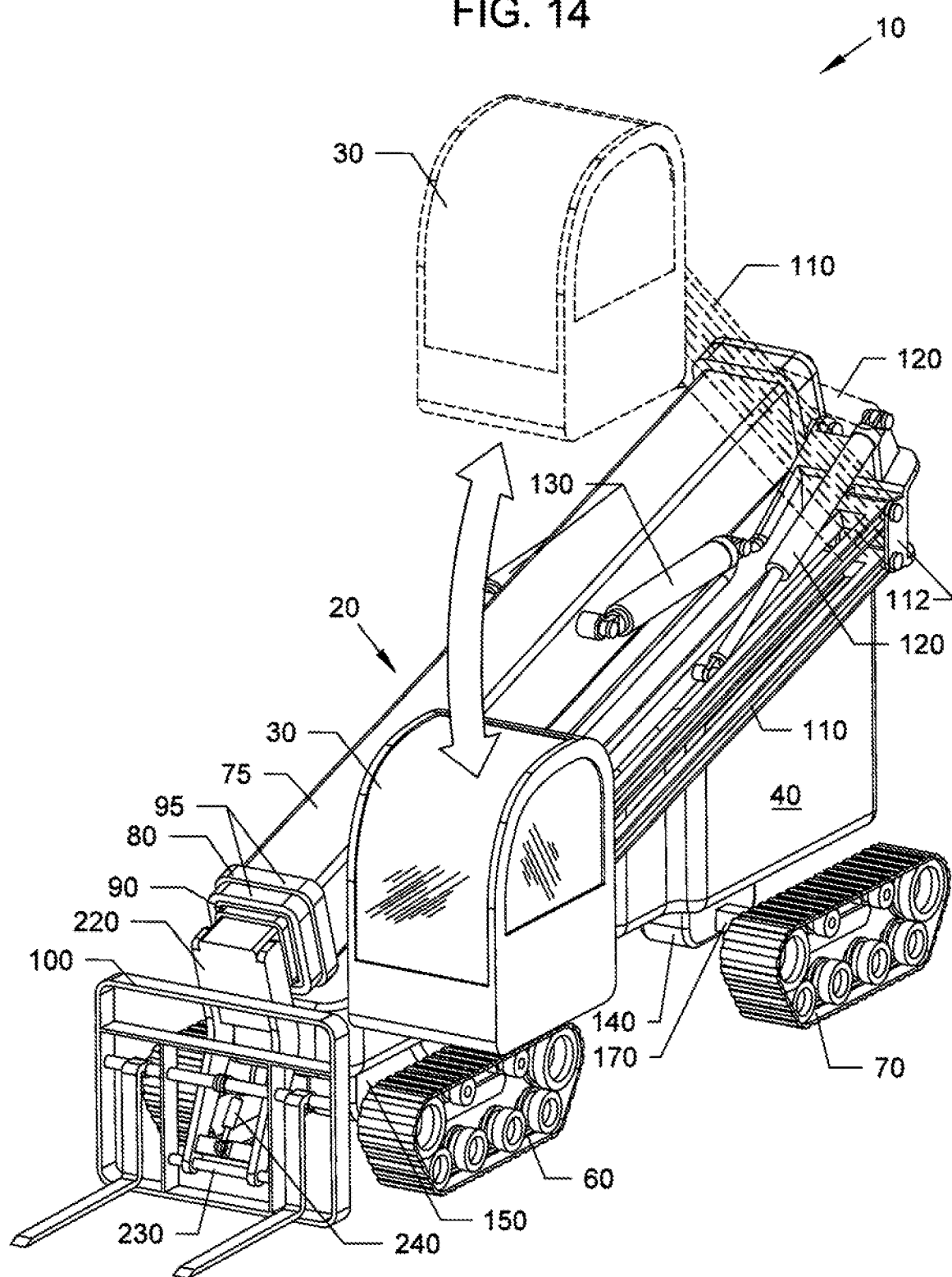
FIG. 14 is a front right perspective view of the vehicle of FIG. 11 showing range of motion of articulating cab.

FIG. 10 is a rear view of the vehicle 10 of FIG. 5. FIG. 11 is a front right perspective view of the vehicle 10 of FIG. 1 with the telescoping boom 20 and articulating cab 30 fully down. FIG. 12 is a front right perspective view of the vehicle 10 of FIG. 12 with the telescoping boom 20 raised slightly and the cab 30 raised above the telescoping boom 20 for operator visibility. FIG. 13 is a front right perspective view of the vehicle 10 of FIG. 12 with the telescoping boom 20 full raised and extended. And, FIG. 14 is a front right perspective view of the vehicle 10 of FIG. 11 showing range of motion of the articulating raiseable and lowerable cab 30.

Referring to FIGS. 1-14, the all-terrain versatile vehicle 10, shown in the form of a telehandler, may be comprised of two body parts, which includes a rear body 40 and front body 40. The rear body 40 may include an engine compartment 40, which houses the vehicle engine and is the foundation of a rear oscillating track assembly 70. The rear oscillating track assembly 70 may include a right track attached on a lower rear right side of the rear body 40 and a left track attached on a lower rear left side of the rear body 40. Similarly, the front oscillating track assembly 60 may include a right front track attached on a lower front right side of the front body 50 and a left front track attached on a lower front left side of the front body 50. More detail regarding the oscillating track assemblies 60, 70 will be provided in FIGS. 29-35 and the related description.

The front body 50 with the superstructure may be attached to the rear body 40 with engine compartment, by superstructure hinge bracket 190 which is attached to an engine compartment engine bracket 200 by a hinge bracket pivot pin 210.

Referring to FIGS. 1-13, the telescoping boom 20 may include a large boom section 75 with a middle boom section 80 that can telescope in and out of, and a small boom section 90 that can telescope in and out of the middle boom section 80. Stops 95 may limit the fully retracted positions of the middle boom section 80 within the large boom section 75, and the small boom section within the middle boom section 80. Similar internal stops, not shown, may also limit the fully extended positions of the middle boom section 80 relative to the large boom section 75, and the small boom section 90 relative to middle boom section 80.

The bottom of the large boom section 75 can include a boom hinge pin 25 which rotatably attaches the telescoping boom 20 to an upper end superstructure brackets 58, which together function as a boom hinge for allowing the telescoping boom 20 to pivot up and down relative to the upper end brackets 58 of the superstructure 50. A pair of hydraulic cylinders 130 (such as but not limited to those used in U.S.

Pat. No. 6,024,232 to Helgesson and U.S. Pat. No. 4,632,630 to Maki et al., which are both incorporated by reference in their entirety) can be used. Each of the hydraulic cylinders 130 may have outer pivotal ends that can be attached to both the large boom section 75 and the upper end superstructure brackets 58, where the telescoping hydraulic cylinders 130 can raise and lower the telescoping boom 20.

The superstructure 50 can have a side view that appears to have a generally triangular configuration, and the superstructure 50 can include an upper ramped top with raised sides 56 for capturing the telescoping boom 20 when in its most lowered position.

The outer end of small boom section 90 of the telescoping boom 20 can include a fork assembly 100 with a fork bracket 220 attached thereon, by a fork assembly hinge pin 230, where a fork assembly hydraulic cylinder 240 (such as but not limited to those described in U.S. Pat. No. 4,632,630 to Maki et al., which is incorporated by reference in its entirety) can adjust the angle of the fork bracket 220 relative to the telescoping boom 20.

Referring to FIGS. 1-14, the vehicle 10 can include a cab 30 that can be raised and lowered from an upper hinged bracket 118 attached to an upper end of parallel cab linkage arms 110 which are attached to a lower hinged bracket 112 which is attached to an upper portion bracket 54 of the superstructure 50. A hydraulic cylinder 120, such as those described in U.S. Pat. No. 5,890,557 to Glass et al., which is incorporated by reference in its entirety, can be used to control the raising and lowering of the cab 30.

Figure 15:
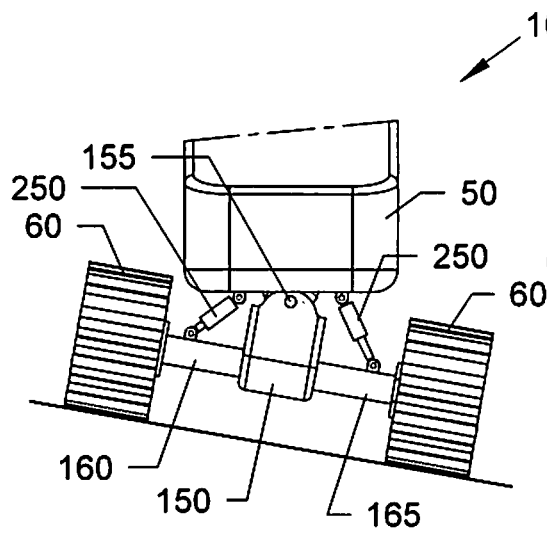
FIG. 15 is a lower front view of the front tracks, and front axle of the vehicle of the preceding figures showing how the axle is able to adjust, via pivot pin and hydraulic cylinders controlled by the operator, to ground level changes and keep the vehicle front and rear body and superstructure level.
Figure 16:
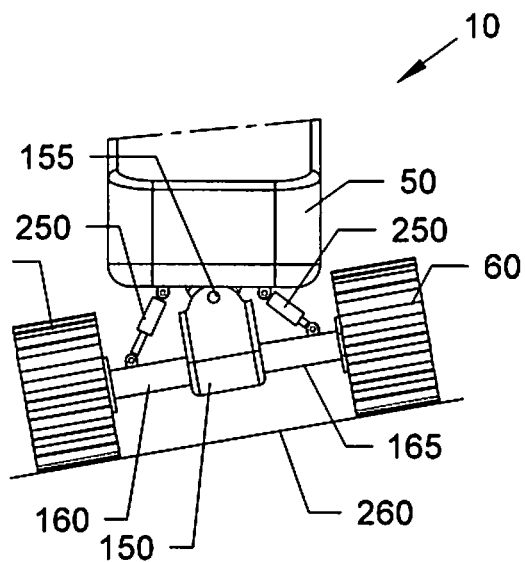
FIG. 16 is another view of FIG. 15 with the axle tilted in an opposite orientation.

FIG. 15 is a lower front view of the front track assembly 60 of the vehicle 10 which includes a front left track attached to a middle front track bracket 150 by a front left axle housing 160, and a front right track attached to the middle front track bracket by a front right axle 165, with the front track assembly tilted down to the right. FIG. 16 is another view of FIG. 15 with the front track assembly 60 tilted in an opposite orientation.

The axle housings 160, 165 are able to adjust, via bracket pivot pin 155 which attaches the bottom of the front body 50 to the middle front bracket 50. The front track assembly 60 is able to be tiltable up and down based on hydraulic cylinders 250 (such as those described in U.S. Pat. No. 5,180,028 to Perrenoud, Jr., which is incorporated by reference in its' entirety) controlled by an operator in the cab 30, to ground level changes and keep the vehicle front body 50 and rear body 40 and superstructure level. Alternatively, it is envisioned that hydraulic cylinders 250 may be automatically actuated in response to directions received from a controller. The controller may generate and transmit such actuation directions to the hydraulic cylinders 250 in view of electronic signals generated by level sensors (such as, for example, gyroscopic sensors). In such embodiments, it is an advantage that the front body 50 and/or rear body 40 may be kept level without need for manual operator input.

Figure 17:
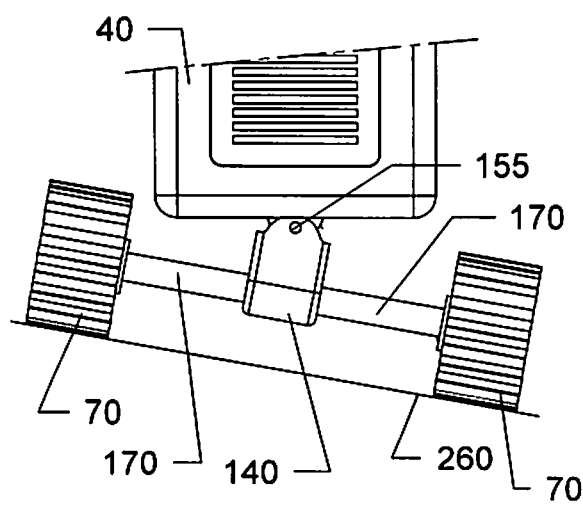
FIG. 17 is a lower rear view of the vehicle of the preceding figures of engine compartment, rear tracks, and rear axle showing how the axle is able to adjust to ground level changes via pivot pin. The engine compartment leveling feature does not have to be hydraulically powered and is free-pivoting and follows the lead of the superstructure.
Figure 18:
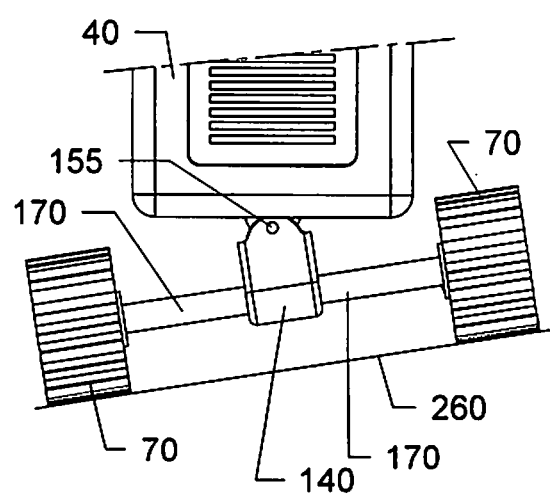
FIG. 18 is another view of FIG. 17 with the axle tilted an opposite orientation.

FIG. 17 is a lower rear view of the vehicle 10 of the preceding figures of engine compartment (rear body) 40, rear track assembly 70, and rear axle 170 showing how the axle 170 is able to adjust to ground level changes via pivot pin 155 that attached a bottom of the rear body 40 to a middle rear bracket 140. The engine compartment (rear body 40) leveling feature is not hydraulically powered and is free-pivoting and follows the lead of the superstructure (front body) 50. FIG. 18 is another view of FIG. 17 with the axle 170 tilted an opposite orientation.

FIG. 19 is a bottom right perspective view of the vehicle 10 of the preceding figures showing the axle's 160, 165 and 170 and track assemblies 60, 70 parallel to one another and parallel to the superstructure (front body) 50.

FIG. 20 is another perspective view of FIG. 19 showing how the front track assembly 60 with axles 160, 165 and pivoting bracket 150 and rear track assembly 70 with rear axle 170 and pivoting bracket 140 rotate about the axle hinge pins 155.

Figure 21:
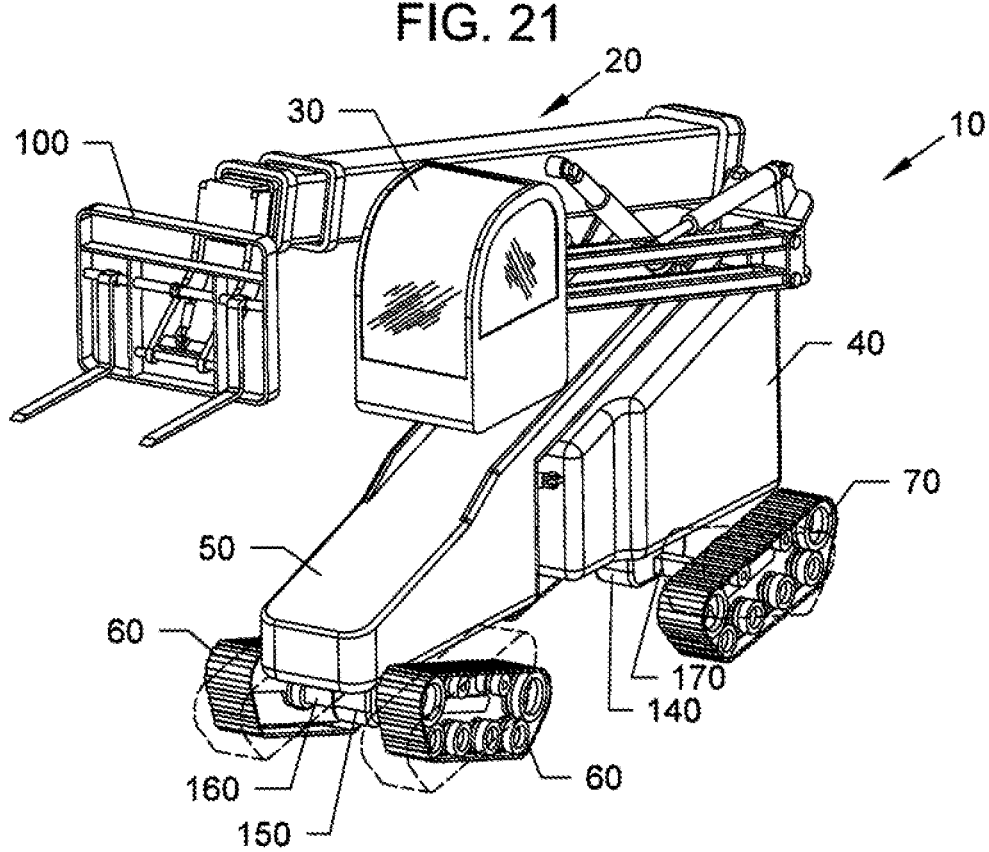
FIG. 21 is a top right perspective view of the vehicle of the preceding figures showing how the tracks articulate by rotating about and relative to their axles. The front tracks can also be locked in any position.
Figure 22:
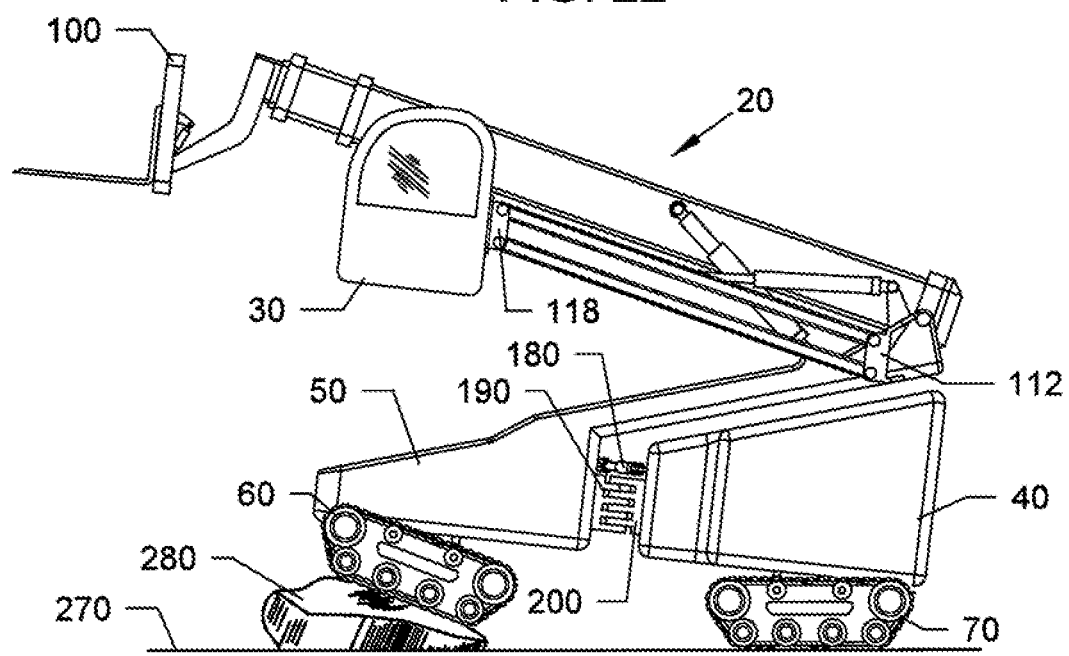
FIG. 22 is a right side view of vehicle of FIG. 21 showing the utility of the articulating tracks in overcoming an obstacle.

FIG. 21 is a top right perspective view of the vehicle 10 of the preceding figures showing how the track assemblies 60 and 70 can oscillate by rotating about and relative to their axles 160, 165, and 170, respectively. The track assemblies 60, 70 may also be locked in any oscillated position. FIG. 22 is a right side view of vehicle 10 of FIG. 21 showing the utility of the oscillating tracks of the front track assembly 60 in overcoming an obstacle 280, such as but not limited to a rock, log, or other obstacle, and the like. The oscillating track assemblies 60, 70 provide an advantage of maintaining optimum traction and stability when the vehicle traverses ground surfaces with obstacle(s) 280, and/or a relatively level ground surface 270 and/or ground surfaces that are not level such as those shown in FIGS. 15-18.

FIG. 23 is a front right perspective view of the vehicle 10 of the preceding figures showing the rear engine compartment (rear body) 40 articulated to the left relative to the superstructure on the front body 50. FIG. 24 is another view of FIG. 23 with the engine compartment (rear body) 40 articulated to the right relative to the superstructure on the front body 50.

Figure 25:
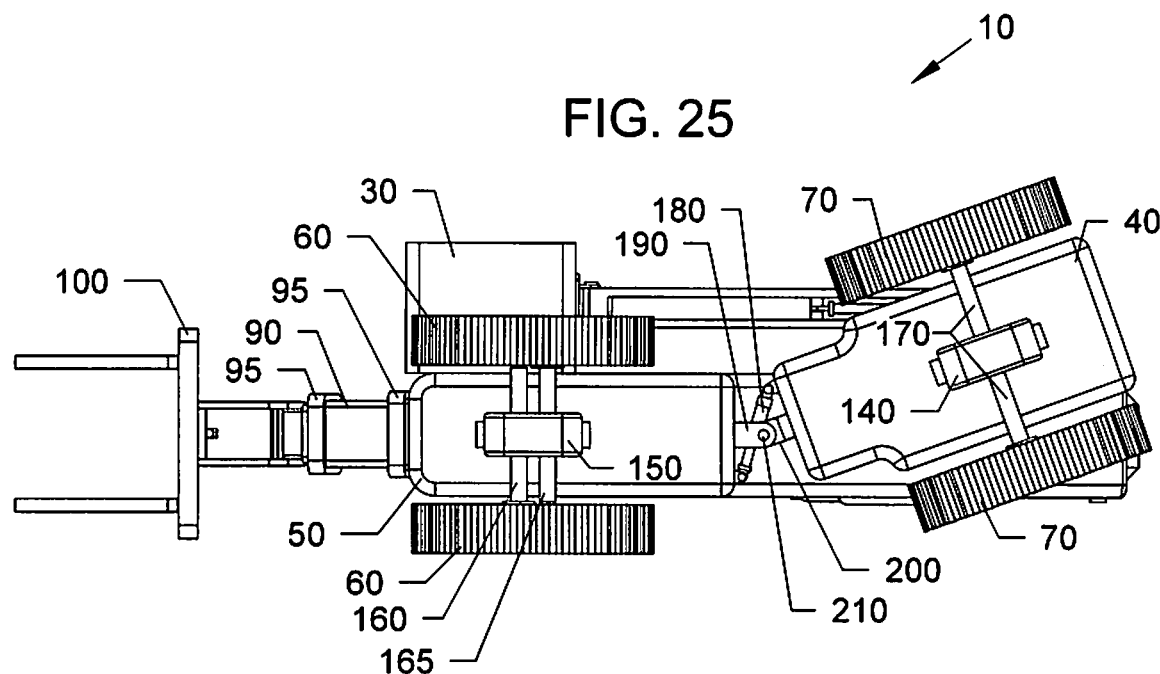
FIG. 25 is a bottom view of the vehicle of FIG. 24.
Figure 26:
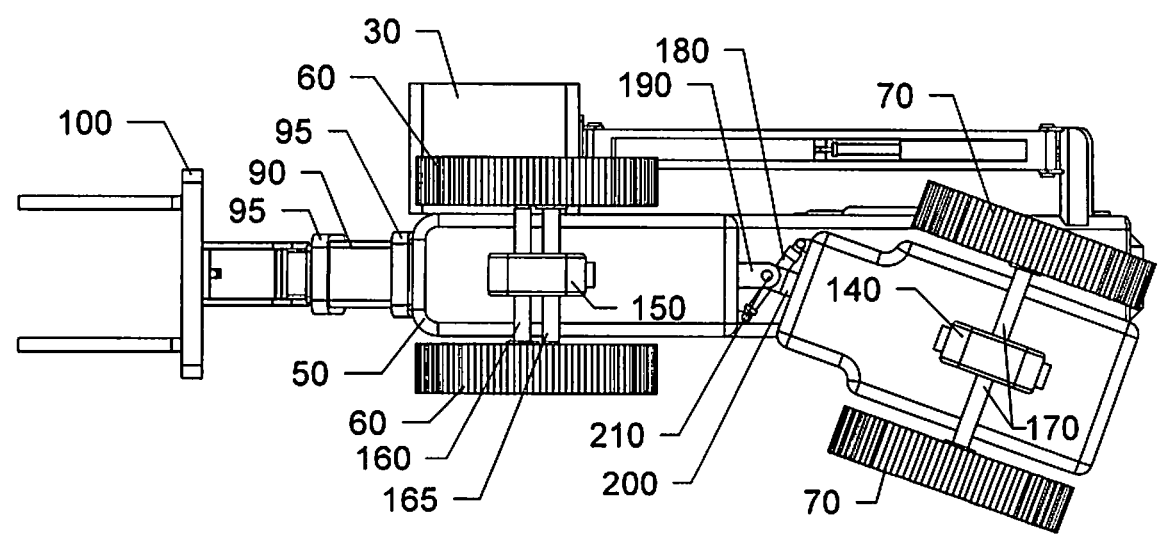
FIG. 26 is a bottom view of the vehicle of FIG. 23.

FIG. 25 is a bottom view of the vehicle 10 of FIG. 24. FIG. 26 is a bottom view of the vehicle 10 of FIG. 23.

Referring to FIGS. 5, 6, 8 and 22-26, the hinge components 190, 200, 210 allow for the front body 50 to articulate to the right or left relative to the rear body 40. A hydraulic cylinder(s), such as those previously described can be used to allow an operator in the cab 30 to manually control the angle orientation of the front body 50 to the rear body 40.

Figure 27:
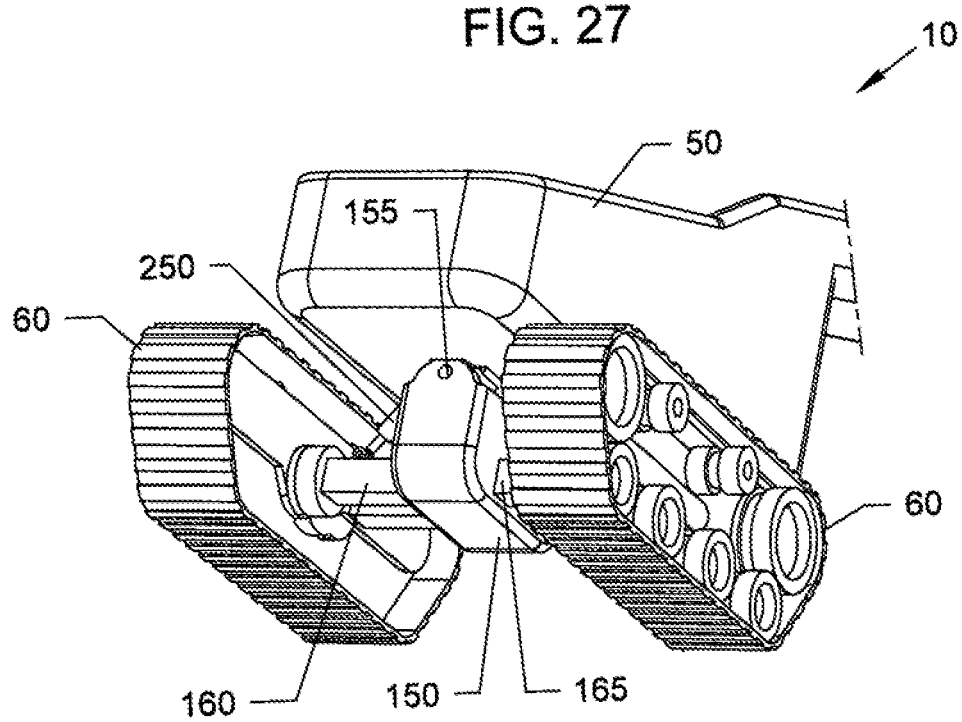
FIG. 27 is a front bottom perspective view of the front body with superstructure showing the axles and tracks, with the inner axles are retracted into the axle housings in this view.

FIG. 27 is a front bottom perspective view of the front body 50 with superstructure showing the axle housings 160, 165 and oscillating track assemblies 60 comprising the left track and the right track, with the inner telescoping axles 163, 167 (shown in FIG. 28) being retracted into the respective axle housings 160, 165 in this view.

Figure 28:
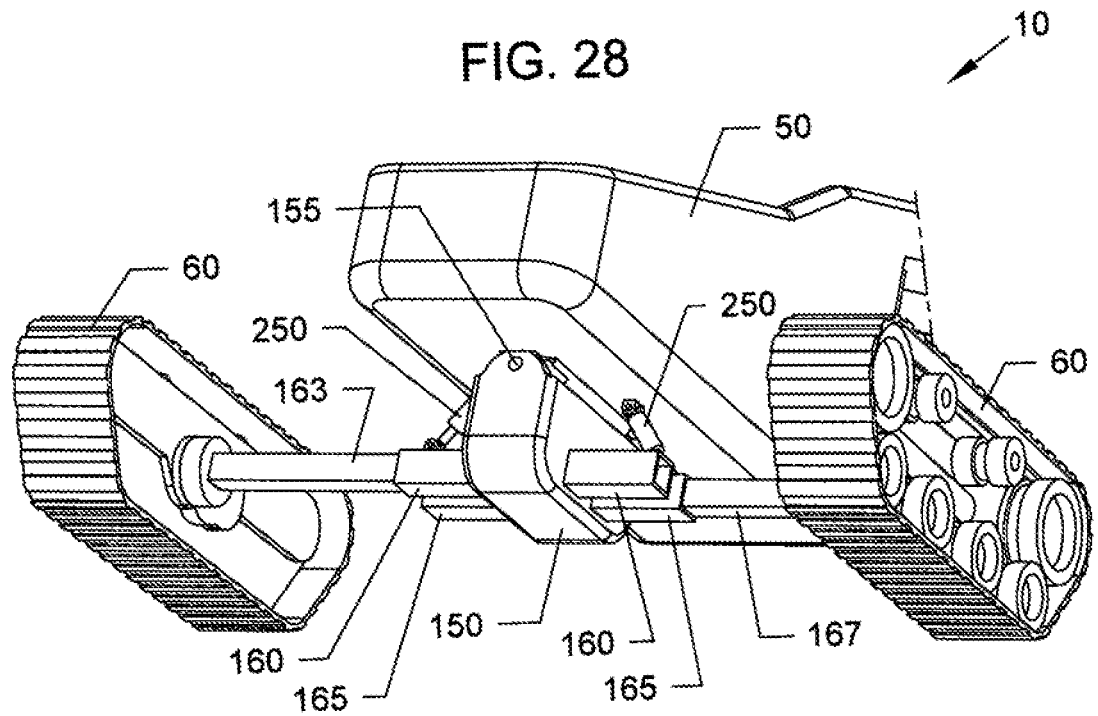
FIG. 28 is another view of FIG. 27 with the inner extendable axles fully extended. This places the tracks further away from the superstructure for increased stability.

FIG. 28 is another view of FIG. 27 with the inner extendable axles 163, 167 fully extended from their respective axle housings 160, 165, which places the right and left tracks further away from the superstructure (front body) 50 for increased stability over different ground surfaces. It is an advantage of certain embodiments that the extendable axles 163, 167 preclude any need for outrigging as used on prior art heavy equipment and machinery. By extending the extendable axles 163, 167 to maximize the distance between the tracks 60, the stability of the machinery against tipping is optimized.

Referring to FIGS. 27-28, a pair of hydraulic cylinders 250, such as those previously described can separately control each of the extendable inner axles 163, 167 as needed by the operator in the cab 30. While the levelling features shown in the preferred embodiment to not include the rear body (engine compartment) 40, the invention can also be used where both the front body (super structure) 50 and the rear body 50 both include hydraulic cylinder leveling controls.

Oscillating Track System with Oscillating Track Lock Subsystem

Turning now to FIGS. 29-34, details of an exemplary embodiment for an oscillating track system comprising an oscillating track lock subsystem solution are shown and described. As can be seen in the previous illustrations of FIGS. 1-28, the exemplary and novel telehandler comprises four oscillating track systems—two front oscillating track systems and two rear oscillating track systems. Each one or more of the oscillating track systems may further comprise an oscillating track lock subsystem, as will be shown and described in more detail below. It is envisioned that embodiments of the novel telehandler may comprise less than four oscillating track systems such as, for example, two front oscillating track systems and two rear wheels, or vice versa. In this way, embodiments of the novel telehandler are not limited to comprising the use of four oscillating track systems. Moreover, it is envisioned that heavy equipment other than a telehandler may comprise oscillating track systems according to the solution in lieu of wheels or skids. For example, it is envisioned that heavy equipment such as, but not limited to, backhoes, crawler dozers, front end loaders, articulating loaders, excavators, skidsteers, feller bunchers, scissor lifts, boom lifts, etc. may benefit from incorporation of oscillating track systems according to the solution.

Figure 29:
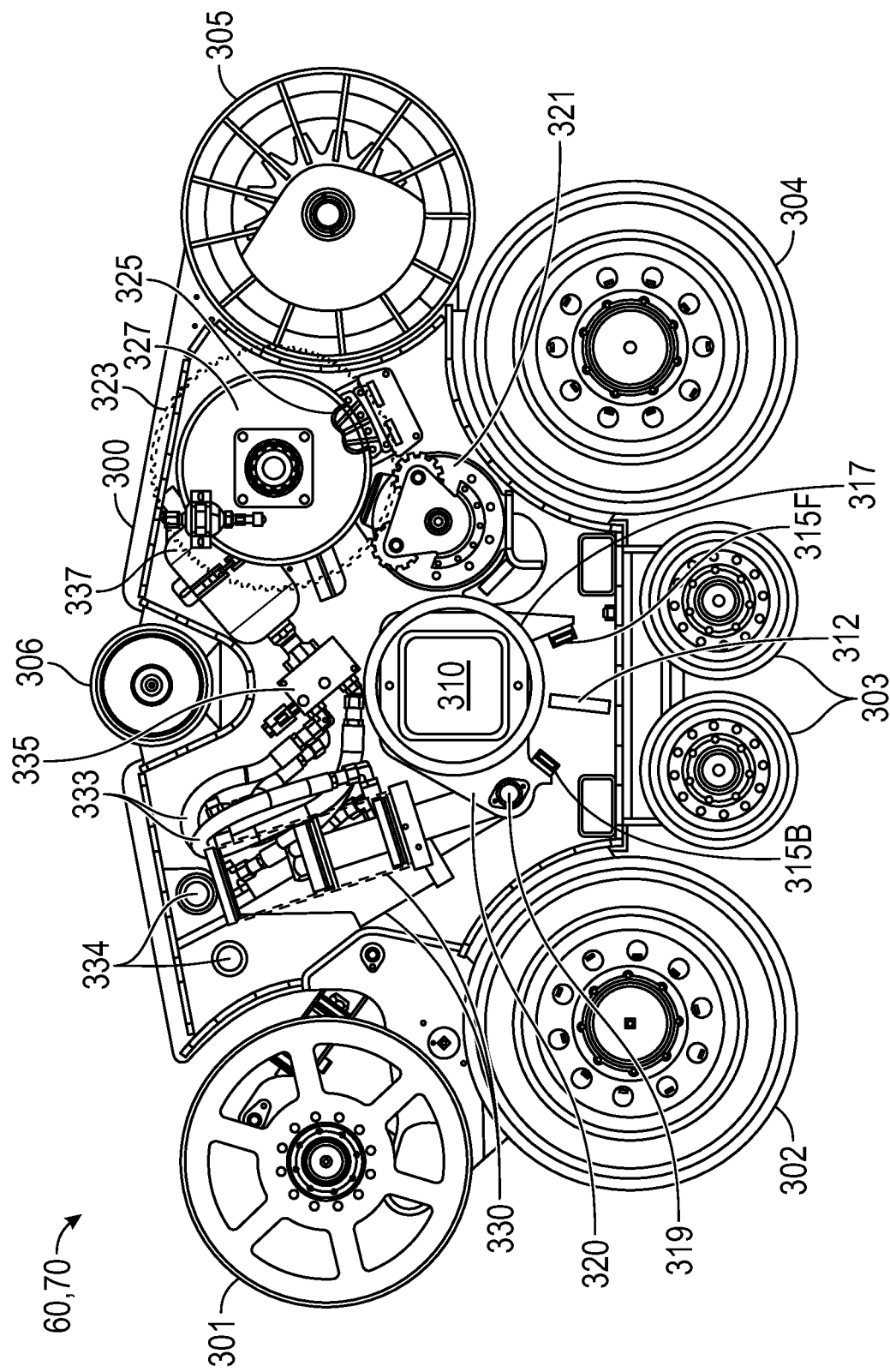
FIG. 29 is a cutaway, front-side view of an exemplary oscillating track system according to the solution, shown in a level position.

FIG. 29 is a cutaway, front-side view of an exemplary oscillating track system 60, 70 according to the solution, shown in a level position. The exemplary oscillating track system 60, 70 includes a housing 300 that defines an internal space as well as a general structure upon which various components of the system 60, 70 may be operationally mounted. Some components of the exemplary oscillating track system 60, 70 may be operationally mounted external to the housing 300 while other components may be operationally mounted within the internal space defined by the housing 300, as would be understood by one of ordinary skill in the art reviewing the figures and this disclosure. Notably, however, the particular oscillating track system 60, 70 illustrated in the figures is only exemplary in nature and, as such, it is envisioned that alternative embodiments of an oscillating track system 60, 70 may include different combinations of components operationally mounted externally versus internally to the housing 300 without departing from the scope of the solution.

Figure 30:
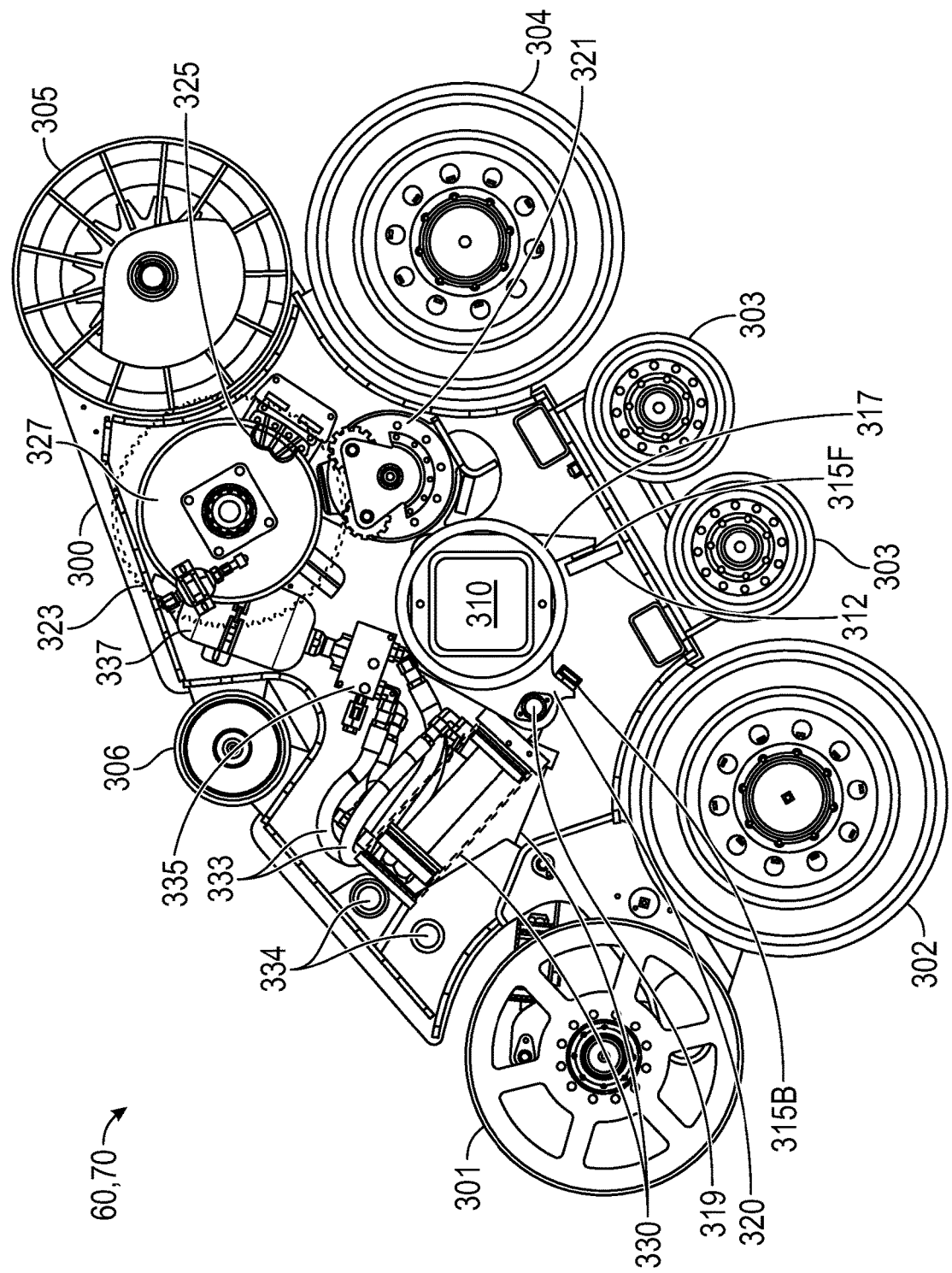
FIG. 30 is a cutaway, front-side view of the exemplary oscillating track system of FIG. 29, shown in a forward-tilt position.
Figure 31:
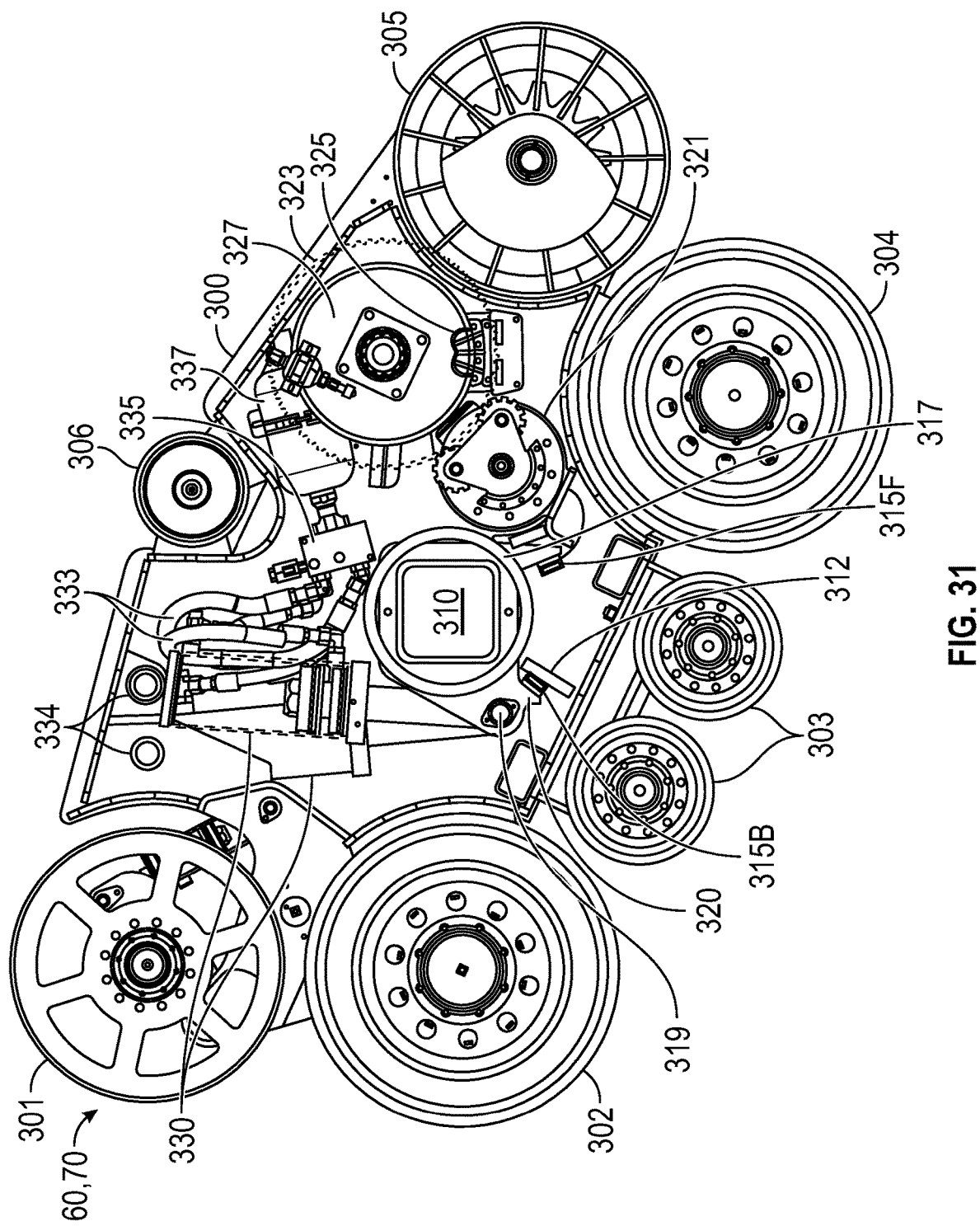
FIG. 31 is a cutaway, front-side view of the exemplary oscillating track system of FIG. 29, shown in a backward-tilt position.

As can be seen in the FIG. 29 illustration (as well as the FIGS. 30 and 31 illustrations that follow), a series of wheels 301, 302, 303, 304, 305 and 306 are mounted external to the housing 300. A track (shown in the FIGS. 1-28 illustrations, but not shown in the FIGS. 29-31 illustrations) may be simultaneously engaged with the wheels 301, 302, 303, 304, 305 and 306 such that the track is operable to rotate around and along a path defined by the outermost edges of the circumferences of the various wheels 301, 302, 303, 304, 305 and 306. In the exemplary oscillating track system 60, 70, the track (again, not shown in the FIGS. 29-31 illustrations) is driven by wheel 305. An electric motor 321 equipped with a gear drive engages a spur gear 323. As would be understood by one of ordinary skill in the art of gears and sprockets, the spur gear 323 may be sized relative to the gear drive of electric motor 321 at a ratio that optimally leverages rotational speed in view of torque. The spur gear 323 simultaneously engages wheel 305 which may be equipped with teeth configured to transfer torque to the track and, in doing so, provide a motive force to advance the track around the oscillating track system 60, 70. Additionally, the spur gear 323 may be mechanically associated with a braking disc 327 coupled with one or more brake calipers 325. As would be understood by one of ordinary skill in the art, the speed of rotation of spur gear 323 may be slowed via application of the brake calipers 325 to braking disc 327, thereby applying a frictional force to the braking disc 327 that, in turn, slows the speed of rotation of the spur gear 323. When the spur gear rotation speed slows, so slows the rotation of the track.

The brake calipers 325 may be actuated by an operator of the particular heavy equipment (e.g., a telehandler) that is driven by the oscillating track system 60, 70 according to any number of electromechanical and/or mechanical arrangements understood in the art of braking. Moreover, although the particular braking arrangement depicted in the exemplary oscillating track system 60, 70 is of a disc/caliper type, it is envisioned that other braking arrangements may be leveraged by embodiments of the solution including, but not limited to, drum brakes, magnetic brakes, etc.

Moreover, in some embodiments of the solution, the primary braking force is associated with electric motor 321. An operator may cause the speed of rotation for the track to be decreased (or increased) by modifying or changing the rate of rotation of the shaft of motor 321. The rate of rotation of the electric motor 321 may be varied by varying the electrical power supplied to the motor 321, as would be understood by one of ordinary skill in the art of electric motors. In this way, when the electric motor 321 is powered down or up, the speed of rotation of spur gear 323 may be likewise decreased or increased. In such embodiments, the brake calipers 325 and disc 327 may function primarily as a parking brake.

Notably, although the exemplary embodiment of an oscillating track system 60, 70 shown in the figures includes an electric motor 321 equipped with a gear drive that drives a spur gear 323 that, in turn, drives a toothed wheel 305 that, in turn, provides a motive force to a track, other similar as well as not-so-similar arrangements are envisioned and will occur to those skilled in the art and, as such, embodiments of the solution for an oscillating track system will not be limited to the specific gear arrangement shown in the figures and described herein. For example, the gear 323 and gear drive of motor 321 may, in other drivetrain arrangements, take the form of helical gears instead of the straight-toothed spur gears illustrated in the figures. As a further example, it is envisioned that any drivetrain arrangement including any combination in number and type of gears may be leveraged as deemed optimal by one of ordinary skill in the art of drivetrains for a given application and may, therefore, include any combination of spur gears, bevel gears, worm gears, planetary gears, internal/external gear combinations, etc. without departing from the scope of the solution.

Additionally, although the exemplary embodiment of an oscillating track system 60, 70 illustrated in the figures includes an electric motor 321, it is envisioned that other motor types may be leveraged in lieu of, or in addition to, an electric motor such as, but not limited to, a hydraulic motor and pump arrangement. As such, it will be understood that embodiments of the solution for an oscillating track system will not be limited to include an electric motor in the drivetrain.

The housing 300, and therefore by extension the entire oscillating track system 60, 70, is rotatably mounted around square axle 310 such that it can oscillate from a forward-tilt position to a backward-tilt position. In the FIG. 29 illustration, the exemplary oscillating track system 60, 70 is in a substantially level position relative to a plane defined by the bottom surface of square axle 310. The housing is rotatably mounted around square axle 310 via housing/axle coupling 317. Housing/axle coupling 317 may comprise bearings, grease fittings, or the like in order to deter mechanical wear as the housing/axle coupling 317 rotatably translates around axle 310.

Figure 33:
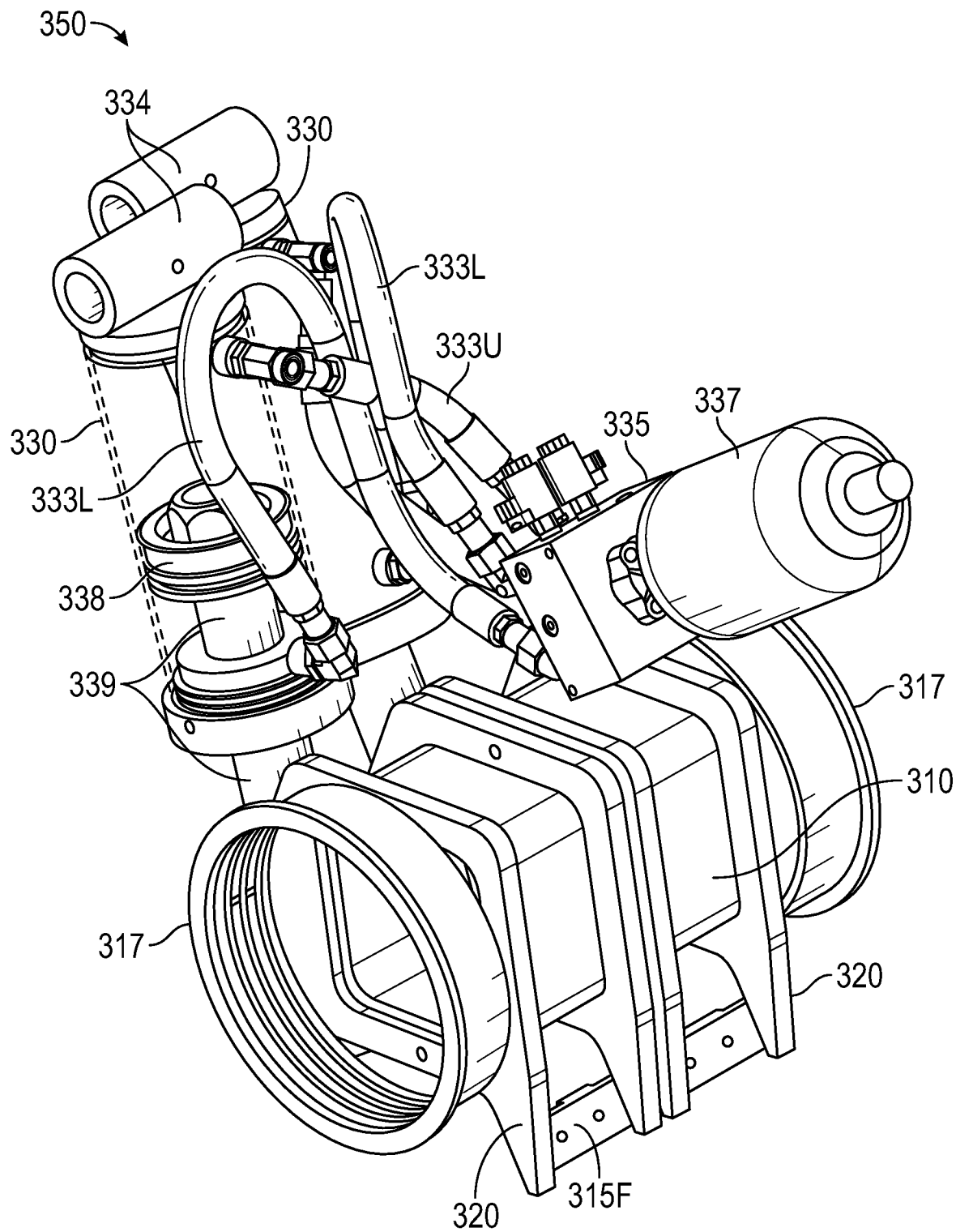
FIG. 33 illustrates the oscillating track lock subsystem comprised within the illustrations of FIGS. 29-32.

Advantageously, the exemplary oscillating track system 60, 70 includes an oscillating track lock subsystem 350 comprising an arrangement of one or more linear stroke cylinders 330, hydraulic hoses 333, one or more accumulators 337 and an isolation valve 335 (isolated in FIG. 33 illustration). The cylinders 330 are mechanically attached to the housing 300 at anchor points 334 and to the axle sleeve 320 at anchor point 319. Notably, although the exemplary embodiment of an oscillating track lock subsystem shown in the figures comprises a pair of linear stroke cylinders 330, it is envisioned that alternative embodiments may leverage a single linear stroke cylinder or multiple cylinders and, as such, the scope of the solution is not limited to use of a pair of linear stroke cylinders 330. Advantageously, the exemplary embodiment of an oscillating track lock subsystem 350 shown in the figures leverages a pair of relatively smaller linear stroke cylinders 330 in lieu of a single, relatively larger cylinder and, in doing so, may be accommodated within the limited internal space defined by housing 300.

Returning to the FIG. 29 illustration, it can be seen that the linear stoke cylinders 330 each comprise a piston 338 and rod 339 (see FIG. 33 for more detail) with the piston 338 positioned substantially at a mid-stroke within its barrel. Correspondingly, the oscillating track system 60, 70 is in a relatively level position as described above. With the oscillating track system 60, 70 in a relatively level position, both a forward-tilt limit stop 315F and a backward-tilt limit stop 315B are substantially equidistant from a stop block aspect 312. The stop block aspect 312 is fixedly mounted internal to the housing 300.

As will be shown in more detail below relative to the FIG. 33 illustration, the oscillating track lock subsystem 350 freely accommodates an oscillating, up and down, movement of the oscillating track system 60, 70 as it follows undulating terrain. As one of ordinary skill in the art would recognize, as an oscillating track system 60, 70 is in operation and traversing uneven ground, the track system 60, 70 may follow the contours of the ground, thereby forward-tilting as the ground beneath the system 60, 70 declines and backward-tilting as the ground beneath inclines (see FIGS. 21-22). This oscillating movement of the track system 60, 70 works to rotatably move the track system 60, 70 about the axle 310 via housing/axle coupling 317, as previously described. Correspondingly, the piston(s) 338 translate linearly up and down, with the piston(s) 338 retracting rod(s) 339 within the barrel(s) as the track system 60, 70 moves toward a more forward-tilted position and extending rod(s) 339 from the barrel(s) as the track system 60, 70 moves toward a more backward-tilt position.

As the track system 60, 70 oscillates, and the piston(s) 338 correspondingly translate their positions linearly, hydraulic fluid flows in and out of the barrels of the linear stroke cylinders 330 in accordance with the movement of the piston(s) 338. The hydraulic fluid accordingly passes back and forth through valve 335 and, in concert, in and out of accumulator 337. Advantageously, an operator of heavy equipment that leverages an oscillating track system 60, 70 having an oscillating track lock subsystem 350 may cause the valve 335 to actuate to a closed position, thereby stopping the flow of hydraulic fluid through the subsystem 350 and effectively locking the oscillating track system 60, 70 in whatever position it may have taken. In this way, the oscillating track lock subsystem 350 may prevent the entire oscillating track system 60, 70 from oscillating, as any rotational movement of the system 60, 70 relative to the axle 310 is prevented when hydraulic fluid is unable to flow in and out of the cylinders 330. Subsequently, the operator may actuate valve 335 to an open flow state, thereby allowing for hydraulic fluid flow through the oscillating track lock subsystem 350 to resume and, in turn, allow for the oscillating track system 60, 70 to oscillate about axle 310.

Notably, the exemplary embodiment of an oscillating track lock subsystem 350 shown in the figures is of a hydraulic arrangement and, advantageously, does not necessarily include a hydraulic pump—the motive force for the fluid flow is provided by the oscillating movement of the oscillating track system 60, 70 as it traverses uneven terrain. Even so, embodiments of the solution for an oscillating track lock subsystem do not necessarily preclude the use of hydraulic pump(s) to assist in hydraulic fluid circulation during normal operation or to provide an alternative motive force that may be leveraged to adjust the rotational position of the track system 60, 70 relative to the axle 310.

Additionally, although the exemplary embodiment of an oscillating track lock subsystem 350 illustrated in the figures is of a hydraulic arrangement, the scope of the solution is not so limited as it is envisioned that alternative embodiments may leverage pneumatic and/or electromechanical arrangements. For example, it is envisioned that an oscillating track lock subsystem may utilize electromagnets in lieu of valve 335 to prevent free movement of a mechanical linkage, thereby locking the subsystem in a position, or utilize a compressor and releasable air brake arrangement to prevent free oscillation.

Moreover, the valve 335 in the exemplary embodiment of an oscillating track lock subsystem 350 illustrated in the figures is of a solenoid type, however, the scope of the solution is not so limited as it is envisioned that alternative embodiments of valve 335 may be in the form of an electrically or pneumatically or hydraulically actuated ball valve or some other quarter-turn valve type. Further, valve 335 may be of a linearly actuated type, whether actuated with an electric actuator, pneumatic actuator or hydraulic actuator such as, but not limited to, a gate valve, a needle valve, or a pinch valve.

With regards to the accumulator 337, it is envisioned that the accumulator may preferably be of a bladder type, although it is envisioned that embodiments of the solution may instead leverage a piston-styled accumulator or other accumulator design particularly suited for a given application. As one of ordinary skill in the art of accumulators understands, a compressible gas may be contained within the accumulator tank such that it is on the "outside" of a bladder, for example, that is also within the accumulator tank. As hydraulic fluid, for example, is forced into the bladder the bladder expands and the compressible gas compresses to accommodate a reduced volume. The compressed gas provides a motive force to urge the hydraulic fluid out of the bladder when needed elsewhere in the system such as, for example, within linear cylinders 330 of the exemplary oscillating track lock subsystem. As one of ordinary skill in the art of accumulators would recognize, a piston-styled accumulator may leverage a compressible gas on the topside of a piston within a barrel, thereby facilitating flow of a hydraulic fluid (or some other fluid) in and out of the accumulator within a volume defined within the barrel beneath the piston.

Turning now to FIG. 30, illustrated is a cutaway, front-side view of the exemplary oscillating track system 60, 70 of FIG. 29, shown in a forward-tilt position. Referring to the description above regarding the oscillation of the oscillating track system 60, 70, it can be understood from the FIG. 30 illustration that the track system 60, 70 has oscillated to a forward-tilted position in response to a declining terrain. The oscillating track lock subsystem 350 may remain in an unlocked state with the valve 335 allowing for hydraulic fluid flow through the subsystem 350. The piston(s) 338 have taken fully retracted positions into their respective barrels and, in doing so, operate to contract the distance between the housing anchor points 334 to the axle sleeve anchor points 319. To ensure that the piston(s) 338 are not stroked beyond their limits, forward-tilt limit stop 315F can be seen engaged to stop block aspect 312. Advantageously, actuation of valve 335 such that hydraulic fluid flow through oscillation track lock subsystem 350 is prevented will secure or "lock" the position of the oscillating track system and prevent oscillation away from the forward-tilted position.

FIG. 31 is a cutaway, front-side view of the exemplary oscillating track system 60, 70 of FIG. 29, shown in a backward-tilt position. Referring to the description above regarding the oscillation of the oscillating track system 60, 70, it can be understood from the FIG. 31 illustration that the track system 60, 70 has oscillated to a backward-tilted position in response to an inclined terrain. The oscillating track lock subsystem 350 may remain in an unlocked state with the valve 335 allowing for hydraulic fluid flow through the subsystem 350. The piston(s) 338 have taken fully extended positions toward the bottoms of their respective barrels and, in doing so, extend the rods 339 from the barrels to fully extend the distance between the housing anchor points 334 to the axle sleeve anchor points 319. To ensure that the piston(s) 338 are not stroked beyond their limits, backward-tilt limit stop 315B can be seen engaged to stop block aspect 312. Advantageously, actuation of valve 335 such that hydraulic fluid flow through oscillation track lock subsystem 350 is prevented will secure or "lock" the position of the oscillating track system and prevent oscillation away from the backward-tilted position.

Figure 32:
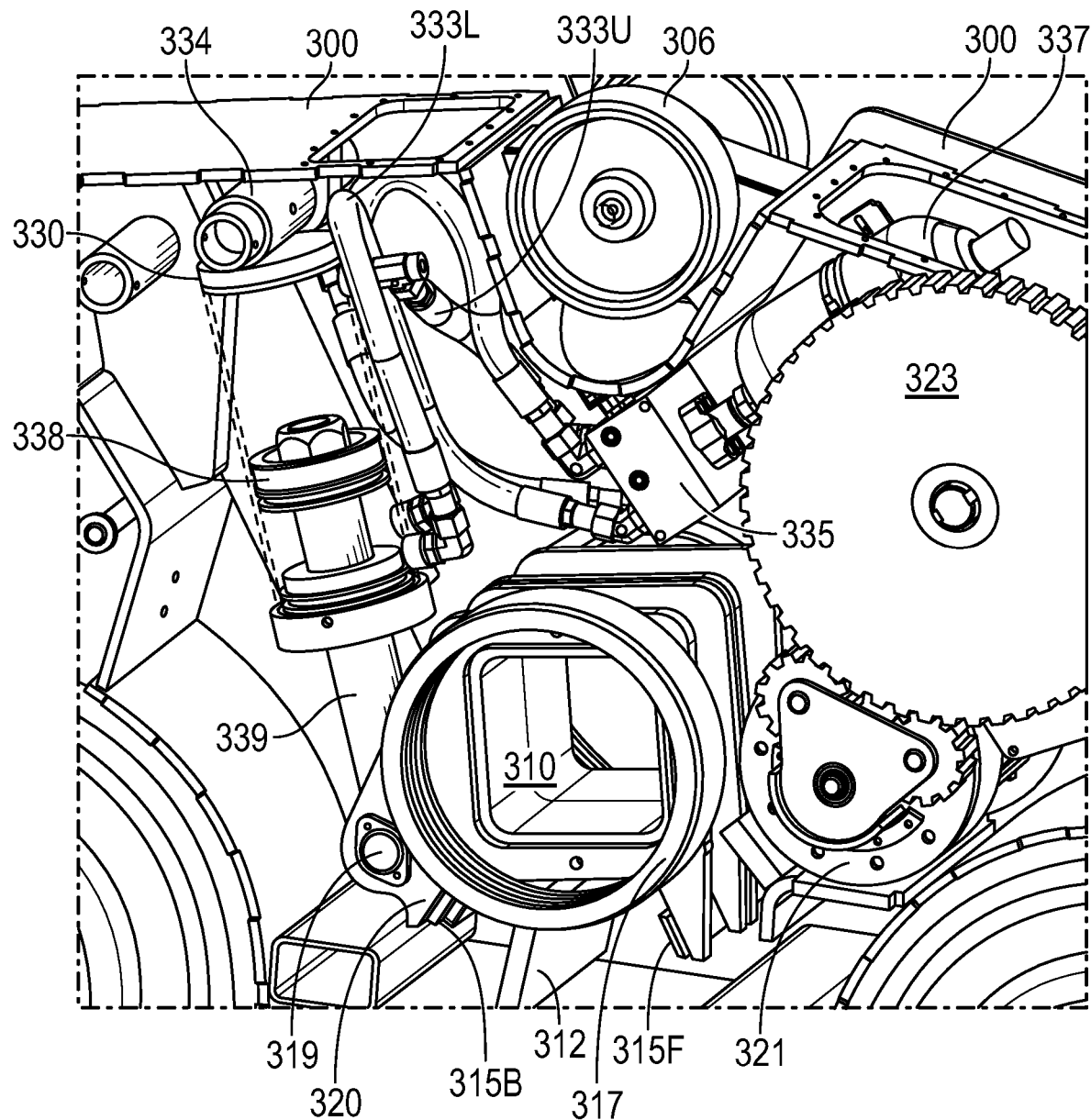
FIG. 32 is a close-up of the cutaway, front-side view of the exemplary oscillating track system of FIG. 29, illustrating various components of an oscillating track lock subsystem and gear drive.

FIG. 32 is a close-up of the cutaway, front-side view of the exemplary oscillating track system 60, 70 of FIG. 29, illustrating various components of an oscillating track lock subsystem 350 and gear drive. As can be better seen in the FIG. 32 illustration, the piston 338 is in a mid-stroke ranged position within its barrel such that the rod 339 is partially extended. As such, the distance between the housing anchor points 334 are at a mid-range distance from the axle sleeve anchor points 319. The axle sleeve 320 is mechanically fixed to the square axle 310 and does not rotate around axle 310. Consequently, extension or retraction of the rod 339 operates to modulate the distance between connection points 334 and 319 such that the housing 300 of the entire oscillating track system is rotated, or oscillated, about the axle 310. During such modulation, hydraulic fluid flows in and out of a lower volume beneath piston 338 via hoses 333L and, similarly, flows in and out of an upper volume above piston 338 via hoses 333U. As described above, the hydraulic fluid transfers from the upper and lower volumes in the cylinders 330 via the valve 335 and accumulator 337. Open flow paths through valve 335 allow for oscillation of the oscillating track system 60, 70 while closed flow paths through valve 335 work to prevent oscillation of the system 60, 70.

FIG. 33 illustrates the oscillating track lock subsystem 350 comprised within the illustrations of FIGS. 29-32. Anchor points 334 fix the linear cylinders 330 to the housing 300 (not shown in FIG. 33). Hydraulic fluid flow through hoses 333 allow hydraulic fluid to pass through valve 335, with excess hydraulic fluid volume being accommodated by accumulator 337. As can be seen in the FIG. 33 illustration, the piston 338 is in a substantially mid-range position within its barrel such as that which was illustrated and described above relative to FIG. 29. The axle sleeve 320 is rigidly attached to the axle 310 and provides for connection points 319 as previously described (not seen in FIG. 33). Axle sleeve 320 also provides for limit stops 315. Housing/axle coupling 317 enables the housing 300 (not shown in FIG. 33) to rotate or oscillate about the axle 310 as the oscillation track lock subsystem 350 modulates.

Figure 34:
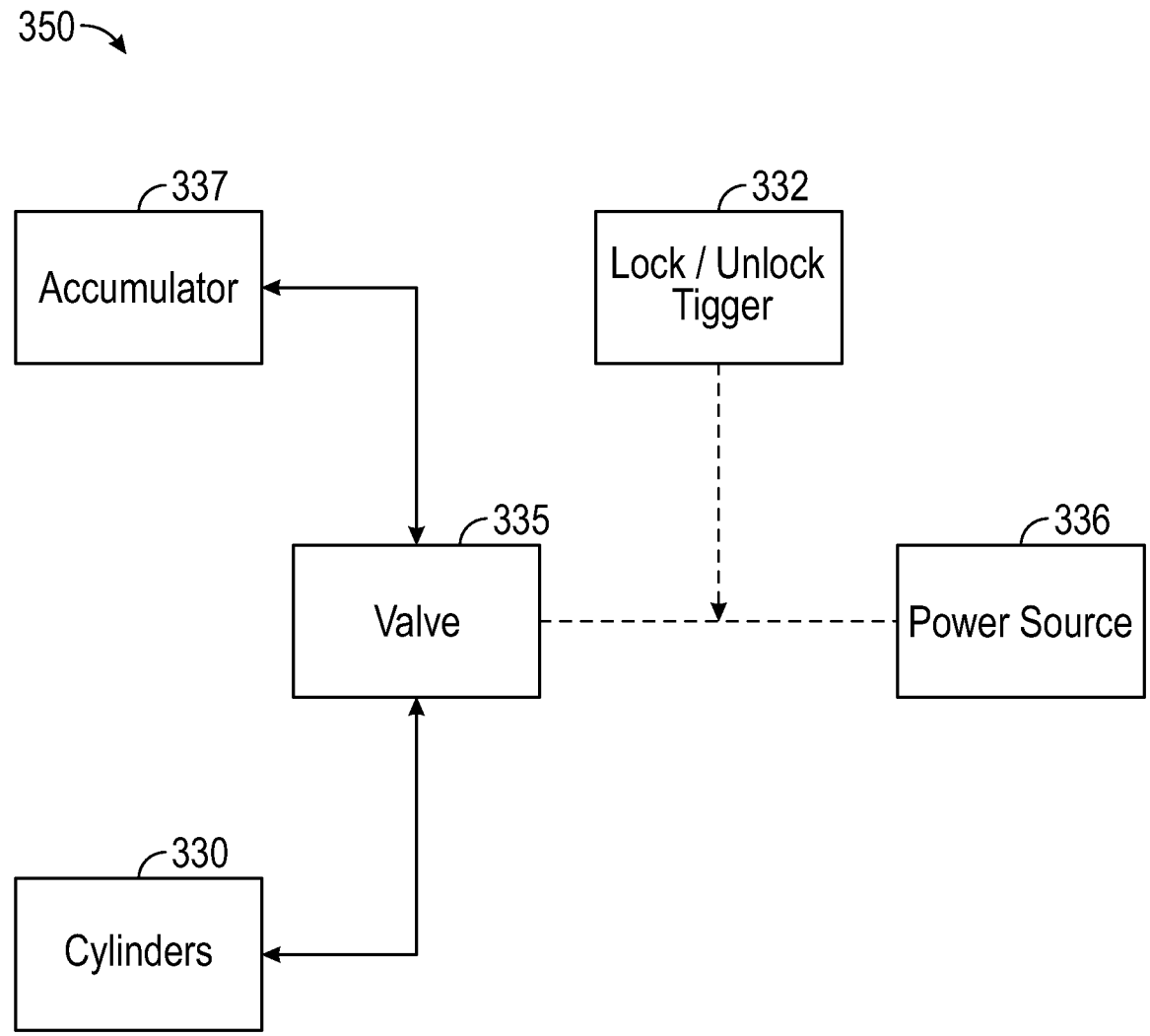
FIG. 34 is a functional block diagram of an exemplary oscillating track lock subsystem according to the solution.

FIG. 34 is a functional block diagram of an exemplary oscillating track lock subsystem 350 according to the solution. A power source 336, such as a 24 VDC or 120 Vac power source, may be in electrical communication with valve 335. As previously described, valve 335 may be a solenoid driven valve and, as such, application or removal of a power supply to the valve 335 may cause it to transition between open and closed states. The valve 335 may be a "normally open" valve in which the fluid flow through the valve body is open when power supply is removed from the solenoid. Similarly, the valve 335 may be a "normally closed" valve in which the fluid flow through the valve body is closed when power supply is removed from the solenoid. An operator of the oscillating track lock subsystem may "make or break" the power supply circuit from the power source 336 to the valve 335 using a lock/unlock trigger 332. Simply stated, the lock/unlock trigger 332 may be a mechanical button or touchscreen radio button accessible by a user. Other forms of a lock/unlock trigger 332 are envisioned and will occur to those of skill in the art.

Actuating the lock/unlock trigger 332 may cause the valve to switch between states of open flow and closed flow. The valve 332, when in an open flow state, allows a hydraulic fluid to freely pass from the accumulator 337 to the upper and lower volumes defined within the cylinders 330, as previously shown and described. Similarly, the valve 332, when in a closed flow state, prevents flow of hydraulic fluid within the subsystem 350 and, in doing so, prevents the oscillating track system 60, 70 from oscillating, as previously shown and described.

Systems, devices and methods an oscillating track system and an oscillating track lock subsystem have been described using detailed descriptions of embodiments thereof that are provided by way of example and are not intended to limit the scope of the disclosure. The described embodiments comprise different features, not all of which are required in all embodiments of an oscillating track system and/or an oscillating track lock subsystem. Some embodiments of an oscillating track system and/or an oscillating track lock subsystem utilize only some of the features or possible combinations of the features. Variations of embodiments of an oscillating track system and/or an oscillating track lock subsystem that are described and embodiments of an oscillating track system and/or an oscillating track lock subsystem comprising different combinations of features noted in the described embodiments will occur to persons of the art.

It will be appreciated by persons skilled in the art that systems, devices and methods for the provision of an oscillating track system and/or an oscillating track lock subsystem is not limited by what has been particularly shown and described herein above. Rather, the scope of systems, devices and methods for the provision of an oscillating track system and/or an oscillating track lock subsystem is defined by the claims that follow.

What is claimed is:
1. An oscillating track system, comprising:
 an enclosed housing defining an internal space, wherein an axle extends through the internal space and the enclosed housing is operable to oscillate around the axle;

a plurality of wheels mounted external to the enclosed housing, wherein at least one of the plurality of wheels is operable to transfer torque to a track;

an axle sleeve rotationally mounted to a portion of the axle residing within the internal space; and an oscillating track lock subsystem residing within the internal space, wherein the oscillating track lock subsystem comprises:

a first mechanical connection to the enclosed housing and a second mechanical connection to the axle sleeve;

a hydraulic cylinder comprising a barrel, a piston and a rod, wherein the barrel and the rod are associated with the first mechanical connection to the enclosed housing and the second mechanical connection to the axle sleeve; and a valve operable to transition between an open flow state and a closed flow state, wherein:

the valve is configured in the open flow state to allow flow of fluid between an upper volume and a lower volume defined within the barrel of the hydraulic cylinder, and the valve is configured in the closed flow state to prevent flow of fluid between the upper volume and the lower volume defined within the barrel of the hydraulic cylinder;

wherein, when the valve is in the open flow state, oscillation of the enclosed housing around the axle causes the piston and the rod to modulate; and wherein, when the valve is in the closed flow state, oscillation of the enclosed housing around the axle is prevented such that the housing is locked in a position.

2. The oscillating track system of claim 1, further comprising:

a stop block fixedly mounted within the internal space of the enclosed housing; and a forward-tilt limit stop and a backward-tilt limit stop fixedly mounted to the axle sleeve, wherein further oscillation of the enclosed housing around the axle in a given rotational direction is prevented when the forward-tilt limit stop or the backward-tilt limit stop mechanically engages with the stop block.

3. The oscillating track system of claim 1, wherein the oscillating track lock subsystem further comprises an accumulator.

4. The oscillating track system of claim 3, wherein the accumulator comprises a bladder.

5. The oscillating track system of claim 3, wherein the accumulator comprises a piston.

6. The oscillating track system of claim 3, wherein the valve comprises a solenoid.

* * * * *